(12) United States Patent
Kurumasa et al.

(10) Patent No.: US 9,986,107 B2
(45) Date of Patent: May 29, 2018

(54) SYSTEMS AND METHODS FOR DISPLAYING REMOTE OPERATION SCREENS OF AN IMAGE FORMING APPARATUS BASED ON A CONFIGURATION OF DISPLAY(S) OF A MOBILE TERMINAL

(71) Applicant: Konica Minolta, Inc., Tokyo (JP)

(72) Inventors: Yoichi Kurumasa, Toyokawa (JP); Yuji Kawamura, Toyokawa (JP); Mie Kawabata, Toyokawa (JP); Kentaro Nagatani, Toyokawa (JP); Jun Kunioka, Okazaki (JP); Hiroshi Sugiura, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/051,099

(22) Filed: Feb. 23, 2016

(65) Prior Publication Data

US 2016/0248922 A1 Aug. 25, 2016

(30) Foreign Application Priority Data

Feb. 24, 2015 (JP) .................................. 2015-034431

(51) Int. Cl.
*G06F 3/12* (2006.01)
*H04N 1/00* (2006.01)
*H04N 1/327* (2006.01)

(52) U.S. Cl.
CPC ..... *H04N 1/00209* (2013.01); *H04N 1/00204* (2013.01); *H04N 1/00307* (2013.01); *H04N 1/00411* (2013.01); *H04N 1/00472* (2013.01); *H04N 1/00973* (2013.01); *H04N 1/32767* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0290680 A1* | 12/2006 | Tanaka | H04N 1/00204 345/173 |
| 2012/0293823 A1* | 11/2012 | Gribel | G06F 3/1205 358/1.13 |
| 2014/0146358 A1* | 5/2014 | Morita | H04N 1/00352 358/1.15 |

FOREIGN PATENT DOCUMENTS

JP 2014-107800 A 6/2014

* cited by examiner

*Primary Examiner* — Henok A Shiferaw
(74) *Attorney, Agent, or Firm* — Baker & Hostetler LLP

(57) ABSTRACT

An image forming apparatus capable of being remotely operated by a mobile terminal includes: a specification unit configured to specify an image to be displayed on the mobile terminal as an operation image for the image forming apparatus; an acquisition unit configured to acquire information on the number of display units of the mobile terminal; a decision unit configured to, when a plurality of images is specified as the operation images and the number of the display units of the mobile terminal is recognized as two or more, make a first decision that at least two of the plurality of images are to be displayed on at least two of the two or more display units of the mobile terminal; and a transmission unit configured to transmit a display instruction based on the first decision to the mobile terminal.

20 Claims, 29 Drawing Sheets

*FIG. 18*

| ID   | X  | Y  | W  | H  |
|------|----|----|----|----|
| 0001 | X1 | Y1 | W1 | H1 |
| 0002 | X2 | Y2 | W2 | H2 |
| 0003 | X3 | Y3 | W3 | H3 |
| 0004 | X4 | Y4 | W4 | H4 |

| ID | X | Y | W | H | ITEM NAME |
|---|---|---|---|---|---|
| 0001 | X1 | Y1 | W1 | H1 | OVERALL VIEW |
| 0002 | X2 | Y2 | W2 | H2 | ROTATE LEFTWARD 90 DEGREES |
| 0003 | X3 | Y3 | W3 | H3 | ROTATE RIGHTWARD 90 DEGREES |
| 0004 | X4 | Y4 | W4 | H4 | DELETE PAGE |

⋮

SYSTEMS AND METHODS FOR DISPLAYING REMOTE OPERATION SCREENS OF AN IMAGE FORMING APPARATUS BASED ON A CONFIGURATION OF DISPLAY(S) OF A MOBILE TERMINAL

CROSS-REFERENCE TO RELATED APPLICATIONS

The present U.S. patent application claims priority to Japanese Patent Application No. 2015-034431, which was filed on Feb. 24, 2015. The entire disclosure of Japanese Patent Application No. 2015-034431, including description, claims, drawings, and abstract, is incorporated herein by reference in its entirety.

BACKGROUND OF THE INVENTION

Field of the Invention

The present invention relates to an image forming system and techniques related to the same.

Description of the Related Art

There is a system that operates remotely an image forming apparatus (MFP (multi-functional peripheral) or the like) by use of a mobile terminal (also called image forming system or remote operation system). In such a system, a screen for remote operation is displayed on a display unit of the mobile terminal, and an operation target device is remotely operated through the screen for remote operation.

In addition, many image forming apparatuses have a touch panel provided in the operation panel. The user performs operation inputs through software keys in the operation panel. Some of image forming apparatuses further have hardware keys as well as the touch panel.

To operate remotely the image forming apparatus, it is preferably allowed to perform not only remote operations related to the software keys in the touch panel of the image forming apparatus but also remote operations related to the hardware keys provided in the MFP.

JP 2014-107800 A describes a technique for allowing remote operations related to software key images in the touch panel of the MFP and remote operations related to hardware keys provided in the MFP. Specifically, JP 2014-107800 A describes a technique by which hardware key images corresponding to the hardware keys in the MFP are superimposed on an image of the operation screen in the MFP (operation image) on the display of the mobile terminal.

However, according to the technique described in JP 2014-107800 A, the hardware key images are superimposed on the operation image including the software key images within one display of the mobile terminal. This poses a problem that the buttons (software key images in the operation image) and others (including various indications near the buttons) arranged under the hardware key images are difficult to view.

SUMMARY OF THE INVENTION

An object of the present invention is to provide a remote operation technique by which reduction in visibility due to superimposition can be suppressed.

The foregoing problem is solved by the following configurations.

(1) To achieve the abovementioned object, according to an aspect, an image forming apparatus capable of being remotely operated by a mobile terminal reflecting one aspect of the present invention comprises: a specification unit configured to specify an image to be displayed on the mobile terminal as an operation image for the image forming apparatus; an acquisition unit configured to acquire information on the number of display units of the mobile terminal; a decision unit configured to, when a plurality of images is specified as the operation images and the number of the display units of the mobile terminal is recognized as two or more, make a first decision that at least two of the plurality of images are to be displayed on at least two of the two or more display units of the mobile terminal; and a transmission unit configured to transmit a display instruction based on the first decision to the mobile terminal.

(2) To achieve the abovementioned object, according to an aspect, a non-transitory recording medium storing a computer readable program, reflecting one aspect of the present invention, causes a computer built in a mobile terminal capable of operating remotely an image forming apparatus to execute the steps of: a) receiving a display instruction describing that at least two images are to be individually displayed as operation images for the image forming apparatus on at least two of a plurality of display units of the mobile terminal; and b) displaying the at least two images as operation images for the image forming apparatus individually on at least two out of the plurality of display units according to the display instruction.

(3) To achieve the abovementioned object, according to an aspect, an image forming system having an image forming apparatus and a mobile terminal capable of operating remotely the image forming apparatus, reflecting one aspect of the present invention, comprises: a specification unit configured to specify an image to be displayed as an operation image for the image forming apparatus on the mobile terminal; a decision unit configured to, when a plurality of images is specified as the operation images and the number of the display units of mobile terminal is recognized as two or more, make a first decision that at least two of the plurality of images are to be displayed on at least two of the two or more display units of the mobile terminal; and a display control unit configured to display the at least two images on the at least two display units of the mobile terminal.

(4) To achieve the abovementioned object, according to an aspect, a non-transitory recording medium storing a computer readable program, reflecting one aspect of the present invention, causes a computer built in a mobile terminal capable of operating remotely an image forming apparatus to execute the steps of: a) receiving from the image forming apparatus a notification that the number of display target images to be displayed on the mobile terminal as operation images for the image forming apparatus is plural; b) when the notification that the number of the display target images is plural is received and the number of display units of the mobile terminal is two or more, making a first decision that at least two of the plurality of images are to be individually displayed on at least two of the two or more display units of the mobile terminal; and c) displaying the plurality of images according to the first decision.

(5) To achieve the abovementioned object, according to an aspect, an image forming apparatus capable of being remotely operated by a mobile terminal reflecting one aspect of the present invention comprises: a specification unit configured to specify an image to be displayed on the mobile terminal as an operation image for the image forming apparatus; and a transmission unit configured to, when a plurality of images is specified as the operation images, transmit to the mobile terminal a notification that the number of display target images to be displayed as the operation images on the mobile terminal is plural, so that the mobile terminal decides whether at least two of the operation images are to be individually displayed on at least two of the plurality of display units of the mobile terminal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 18 is a diagram illustrating information for generation of a second image;

FIG. 28 is a diagram illustrating information for generation of a second image.

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

<1-1. Configuration Outline>

Figure 1:
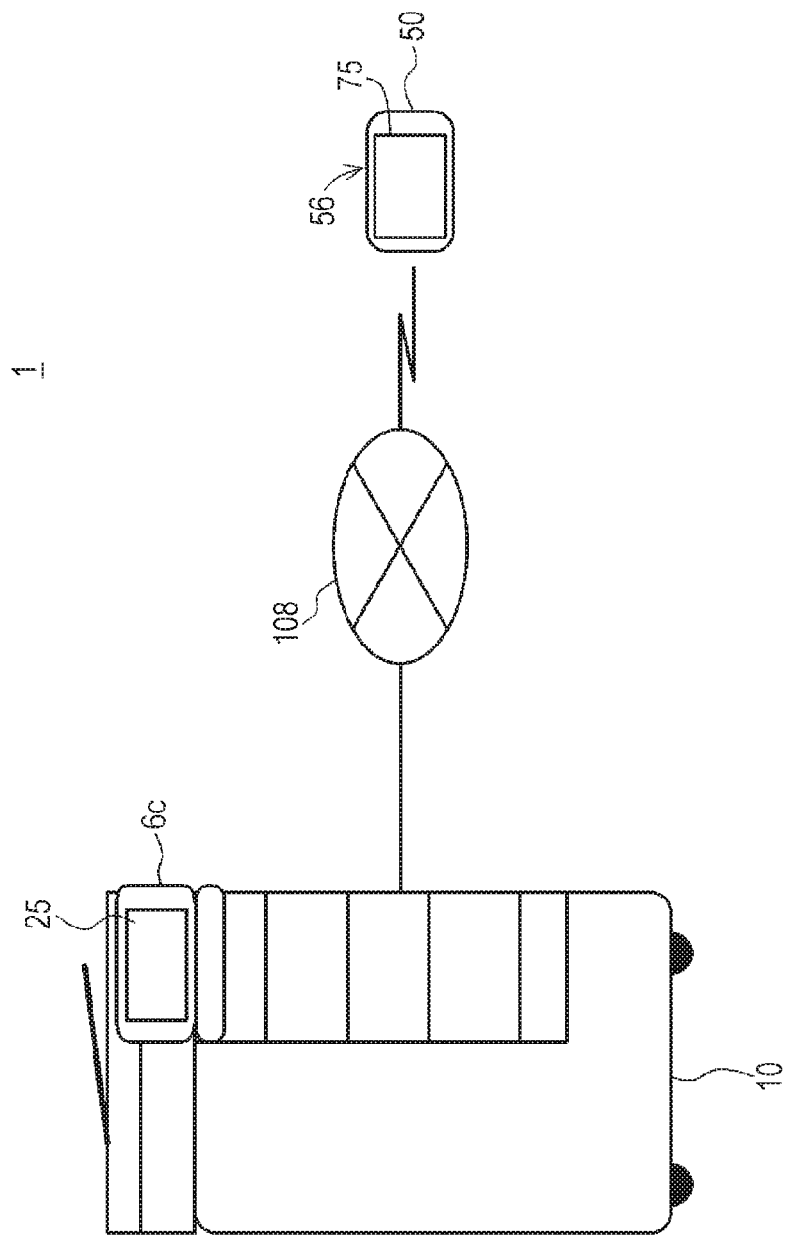
FIG. 1 is a diagram illustrating an image forming system according to a first embodiment.

FIG. 1 is a diagram illustrating an image forming system 1 according to a first embodiment. As illustrated in FIG. 1, the image forming system 1 includes an image forming apparatus 10 and a mobile terminal 50.

The image forming apparatus 10 and the mobile terminal 50 are connected together via a network 108. The network 108 is formed by an LAN (local area network), the internet, or the like. The mode of connection to the network 108 may be wired connection or wireless connection. For example, the image forming apparatus 10 is connected to the network 108 in a wired manner and the mobile terminal 50 is connected to the network 108 in a wireless manner.

In the image forming system 1, various operations can be performed on the image forming apparatus 10 by use of the mobile terminal 50. That is, the mobile terminal 50 can operate remotely the image forming apparatus 10. The image forming system 1 is also expressed as a remote operation system for remotely operating the image forming apparatus 10.

<1-2. Configuration of the Image Forming Apparatus 10>

Figure 2:
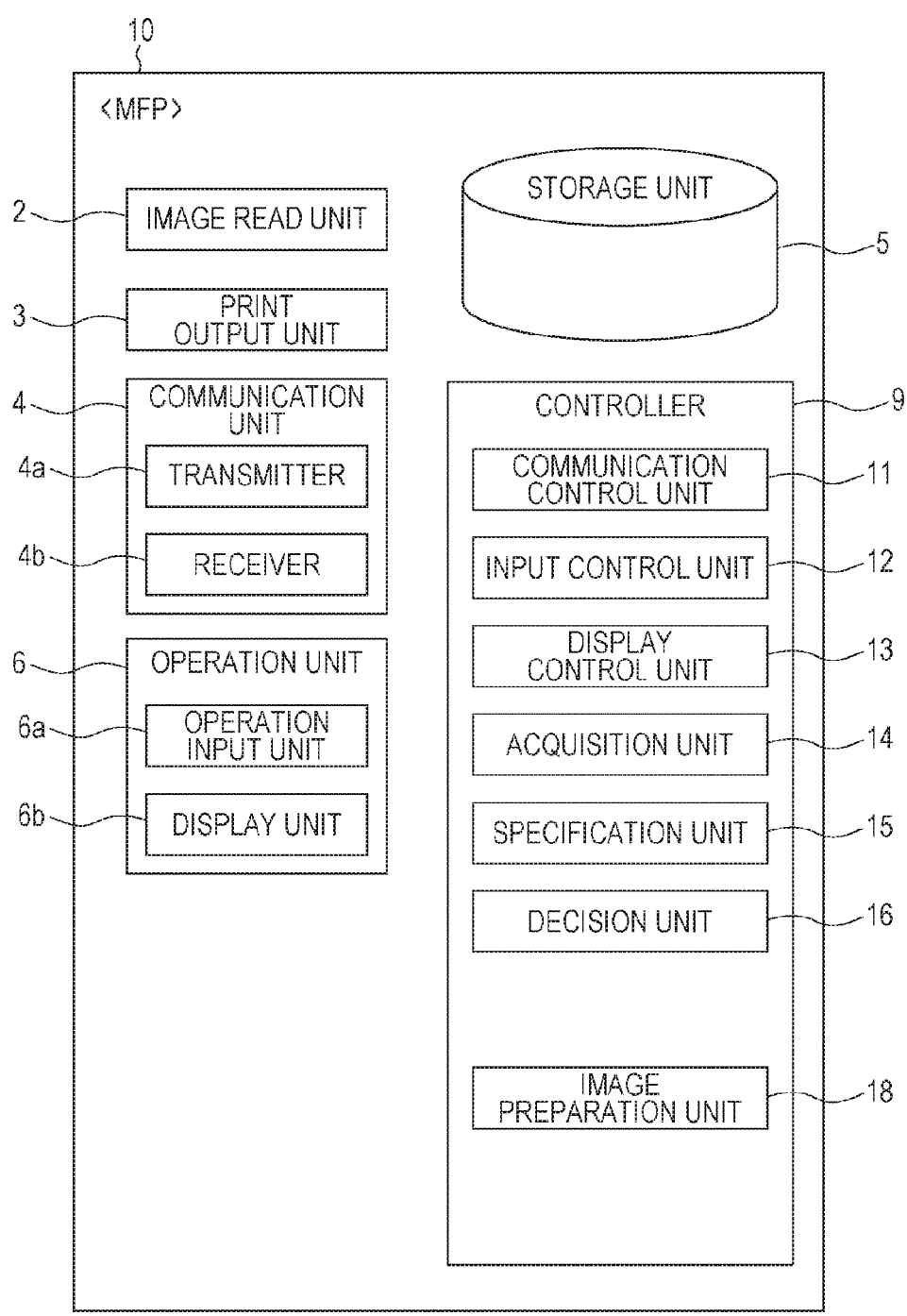
FIG. 2 is a functional block diagram illustrating an image forming apparatus.

FIG. 2 is a diagram illustrating functional blocks of the image forming apparatus 10. In this example, the image forming apparatus 10 is an MFP (multi-functional peripheral). FIG. 2 illustrates functional blocks of the MFP 10.

The MFP 10 includes scan function, copy function, facsimile function, box storage function, and others (also called complex machine). Specifically, the MFP 10 includes an image read unit 2, a print output unit 3, a communication unit 4, a storage unit 5, an operation unit 6, a controller 9, and others as illustrated in the functional block diagram of FIG. 2, and operates these components in combination to implement the various functions.

The image read unit 2 is a processing unit that reads optically (that is, scans) a document placed on the MFP 10 at a predetermined position, and generates image data of the document (also called document image or scanned image). The image read unit 2 is also called scan unit.

The print output unit 3 is an output unit that prints and outputs images on various media such as paper based on data related to a subject to be printed.

The communication unit 4 is a processing unit that can perform facsimile communication via a public line or the like. The communication unit 4 can also perform network communication via the network 108. For the network communication, various protocols such as TCP/IP (Transmission control Protocol/Internet Protocol) are used, for example.

Through the network communication, the MFP 10 can exchange various data with a desired destination (for example, the mobile terminal 50).

The communication unit 4 has a transmitter 4a transmitting various data and a receiver 4b receiving various data.

The storage unit 5 is composed of a storage device such as a hard disc drive (HDD). The storage unit 5 stores data according to a print job.

The operation unit (also called user interface unit) 6 includes an operation input unit 6a that accepts inputs into the MFP 10 and a display unit 6b that displays various kinds of information. As described next, the operation unit 6 includes a touch panel 25, hardware keys 210 (201 to 207 and 211 to 215), and others.

The MFP 10 is provided with an approximately plate-like operation panel unit 6c (see FIG. 1) as the operation unit 6.

The operation panel unit 6c has the touch panel 25 (see FIG. 1) on the front side. The touch panel 25 is formed by embedding piezoelectric sensors and others into a liquid crystal display panel, and can display various kinds of information and accept operation inputs from an operator. For example, the touch panel 25 displays menu images (including button images and others). The operator can press buttons (buttons expressed by button images) virtually arranged in the touch panel 25 to set the contents of various operations to be performed by the image forming apparatus 10. The touch panel 25 serves as not only the operation input unit 6a but also the display unit 6b.

Figure 4:
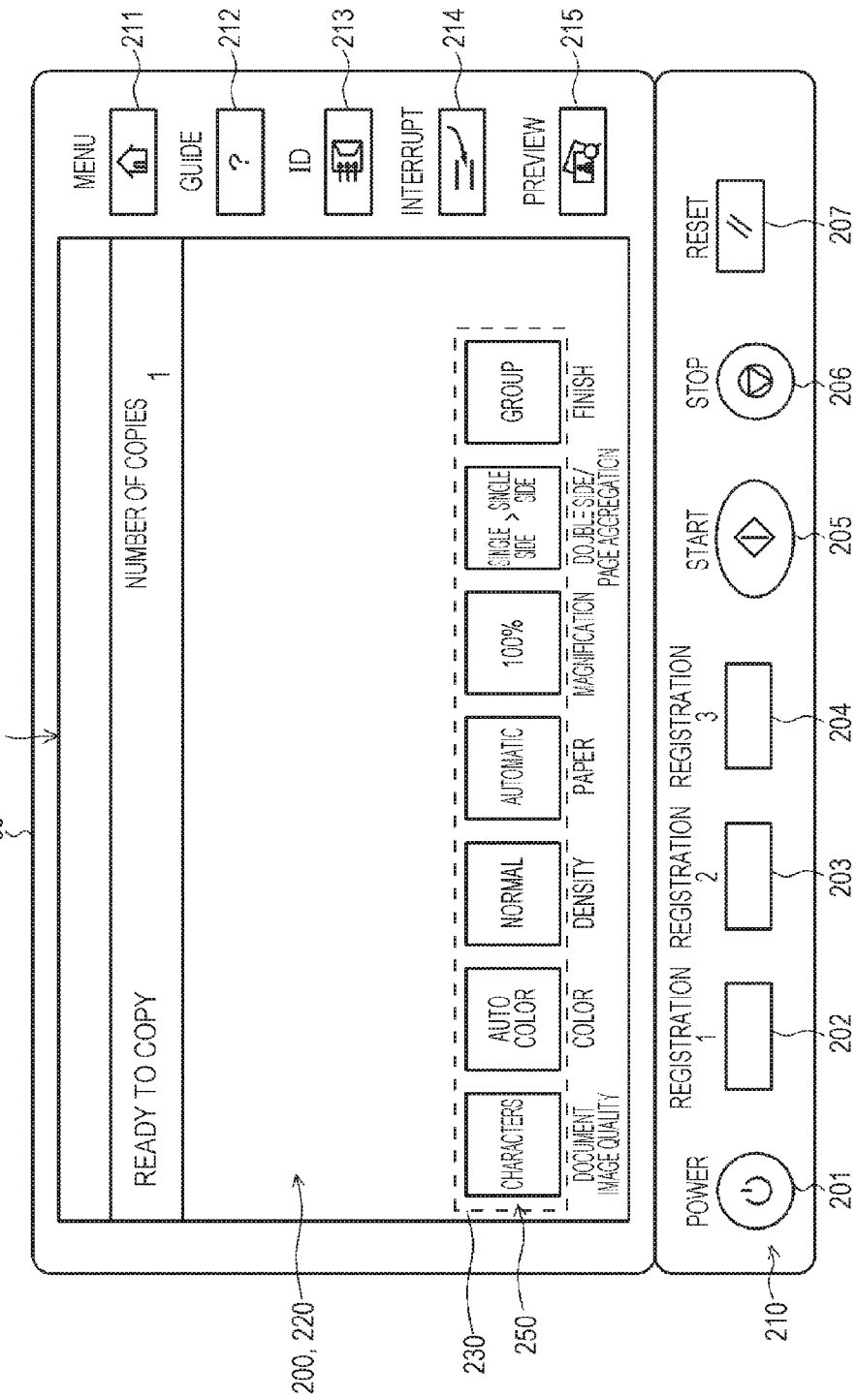
FIG. 4 is a diagram illustrating an example of an operation image displayed on the image forming apparatus.

The operation panel unit 6c is provided with a plurality of hardware keys 210 (201 to 207 and 211 to 215). For example, as illustrated in FIG. 4, the operation panel unit 6c is provided with the plurality of hardware keys 210 such as a power key (sub-power key) 201, a start key 205, a stop key 206, a reset key 207, a menu key 211, a guide key 212, an ID key 213, an interrupt key 214, and a preview key 215. These hardware keys 210 are also expressed as operation input units (operation input unit accepting operation inputs from the operator) provided separately from the touch panel 25.

The controller 9 is a control device that is built in the MFP 10 to perform centralized control of the MFP 10. The controller 9 is formed as a computer system including a CPU, various semiconductor memories (RAM and ROM), and others. The controller 9 implements various processing units by executing predetermined software programs (hereinafter, also referred to simply as programs) stored in the ROM (for example, EEPROM) by the CPU. The programs (specifically, program module groups) may be recorded in portable recording media such as USB memories and installed into the MFP 10 via the recording media, or may be installed into the MFP 10 via the network 108 or the like.

Specifically, as illustrated in FIG. 2, the controller 9 executes the programs to implement various processing units including a communication control unit 11, an input control unit 12, a display control unit 13, an acquisition unit 14, a specification unit 15, a decision unit 16, and an image preparation unit 18.

The communication control unit 11 is a processing unit that controls communication with other devices (the mobile terminal 50 and others). For example, the communication control unit 11 receives from the mobile terminal 50 operation input information as information related to operation inputs from the operator for a remote operation image displayed on the mobile terminal 50.

The input control unit 12 is a control unit that controls operation inputs into the operation input unit 6a (the touch panel 25 and others). For example, the input control unit 12 controls operations of accepting operation inputs into the operation screen displayed on the touch panel 25.

The display control unit 13 is a processing unit that controls display on the display unit 6b (the touch panel 25 and others).

The acquisition unit 14 is a processing unit that acquires information on the number of display units of the mobile terminal 50. The acquisition unit 14 acquires information on the number of display units of the mobile terminal 50 through communication with the mobile terminal 50, for example.

The specification unit 15 is a processing unit that specifies the image to be displayed on the mobile terminal 50 as an operation image (remote operation image) at the image forming apparatus 10.

The decision unit 16 is a processing unit that decides how to display the operation image on the display unit of the mobile terminal 50. For example, the decision unit 16 decides whether to display two images individually on two different display units of the mobile terminal 50.

The image preparation unit 18 is a processing unit that prepares the image to be displayed as a remote operation image.

<1-3. Configuration of the Mobile Terminal 50>

Next, a configuration of the mobile terminal (also called remote operation device) 50 will be described.

The mobile terminal 50 is an information input/output terminal device capable of network communication with other devices. In this example, the mobile terminal 50 is a tablet terminal. However, the mobile terminal 50 is not limited to this but the mobile terminal 50 may be a smartphone, a personal computer or the like.

Figure 3:
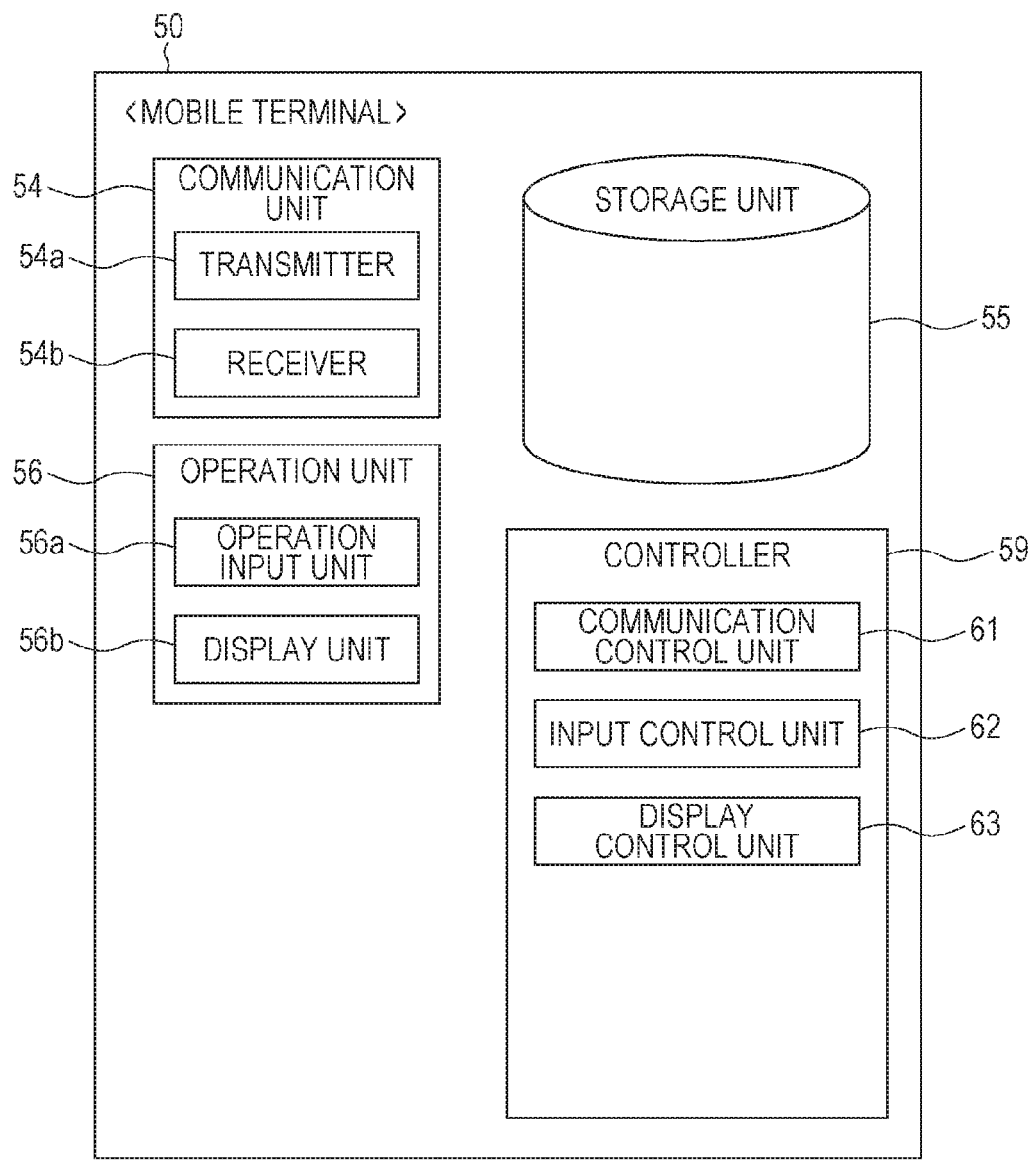
FIG. 3 is a functional block diagram schematically illustrating a configuration of a mobile terminal.

FIG. 3 is a functional block diagram schematically illustrating a configuration of the mobile terminal 50.

As illustrated in the functional block diagram of FIG. 3, the mobile terminal 50 includes a communication unit 54, a storage unit 55, an operation unit 56, a controller 59, and others, and operates these components in combination to implement various functions.

The communication unit 54 is capable of network communication via the network 108. In the network communication, various protocols such as TCP/IP (Transmission Control Protocol/Internet Protocol) are used. Through the network communication, the mobile terminal 50 can exchange various data with desired opposing sides (the image forming apparatus 10 and others). The communication unit 54 has a transmitter 54a transmitting various data and a receiver 54b receiving various data.

The storage unit 55 is composed of a storage device such as a non-volatile semiconductor memory. The storage unit 55 stores temporarily various image data (display data for remote operation screen) transmitted from the MFP 10, for example.

The operation unit 56 includes an operation input unit 56a that accepts inputs into the mobile terminal 50 and a display unit 56b that displays various kinds of information.

The mobile terminal 50 is provided with two touch panels 75 and 77 (see FIG. 1) formed by embedding piezoelectric sensors and others into liquid crystal display panels. Specifically, the touch panel 75 is provided on the front surface of the approximately plate-like mobile terminal 50 at the central portion excluding the outer edge portion (frame portion). The touch panel 77 is provided in the approximately rectangular mobile terminal 50 near a portion corresponding to one long side of the outer edge portion. At the outer edge portion (corresponding to the one long side) of the mobile terminal 50, inclined portions are provided by cutting and rounding the corners of the front surface, and the touch panel 77 is provided at the inclined portions. The touch panel 77 can be viewed from not only the front side of the mobile terminal 50 but also the lateral sides of the mobile terminal 50.

Each of these touch panels 75 and 77 serves as operation input unit 56a and display unit 56b. The touch panel 75 displays the remote operation screen (operation image) described above and accepts operation inputs into the remote operation screen, for example. The touch panel 77 also displays hardware key images and others as operation images and accepts operation inputs into the hardware key images and others as described later, for example.

The controller 59 is a control device that is built in the mobile terminal 50 to perform centralized control of the mobile terminal 50. The controller 59 is formed as a computer system including a CPU, various semiconductor memories (RAM and ROM), and others. The controller 59 implements various processing units by executing predetermined software programs (hereinafter, also referred to simply as programs) stored in the storage unit (a semiconductor memory or the like) by the CPU. The programs (specifically, program module groups) may be recorded in portable recording media such as USB memories and installed into the mobile terminal 50 via the recording media, or may be installed into the mobile terminal 50 via the network 108 or the like.

The programs are application software programs for remotely operating the image forming apparatus 10 and implementing several functions related to remote operations, for example.

Specifically, the controller 59 executes the programs to implement various processing units including a communication control unit 61 and an input/output control unit 65.

The communication control unit 61 is a processing unit that controls communication with the image forming apparatus 10 and others in cooperation with the communication unit 54 and others.

An input control unit 62 is a control unit that controls operation inputs into the operation input unit 56a (the touch panels 75, 77, and others). For example, the input control unit 62 controls the operation of accepting operation inputs into the operation screen displayed on the touch panels 75 and 77.

A display control unit 63 is a processing unit that controls display on the display unit 56b (the touch panels 75, 77, and others). For example, the display control unit 63 controls display on the touch panels 75 and 77.

<1-4. Operation Screen Displayed on MFP>

FIG. 4 is a diagram illustrating an example of an operation image 200 displayed on the MFP 10. As illustrated in FIG. 4, the touch panel 25 of the MFP 10 displays an operation image 220 (220a) for making settings related to copy function, for example.

The operation image 220a has a key (button) arrangement field 230 at the inside lower part. A plurality of (seven in FIG. 4) software key images (hereinafter, also referred to simply as software keys) 250 is arranged in the key arrangement field 230. More specifically, a predetermined number (seven in this example) software keys selected from among a large number of (for example, 20) software keys is displayed in the key arrangement field 230. When a flick operation (for example, a left-and-right flick operation) is performed in the key arrangement field 230, the software keys displayed in the key arrangement field 230 are changed.

The operator of the MFP 10 presses (for example, performs a single tap on) one of the plurality of software keys displayed in the key arrangement field 230 to call a screen for making detailed settings corresponding to the software key to make more detailed settings.

<1-5. Remote Operation Screen Displayed on the Mobile Terminal>

The MFP 10 is capable of being remotely operated through the mobile terminal 50. In this embodiment, for remote operation of the MFP 10 through the mobile terminal 50, the same image as the operation image 220a is displayed on the mobile terminal 50 to accept an instruction from the user.

To implement through remote operation the same instruction as the instruction given by use of the hardware keys of the MFP 10, the hardware key images corresponding to the hardware keys of the MFP are also displayed on the mobile terminal 50 to accept the instruction from the user.

In this embodiment, however, remote operation screens (operation images) are displayed on the mobile terminal 50 according to the number of touch panels (display units) of the mobile terminal 50.

Figure 5:
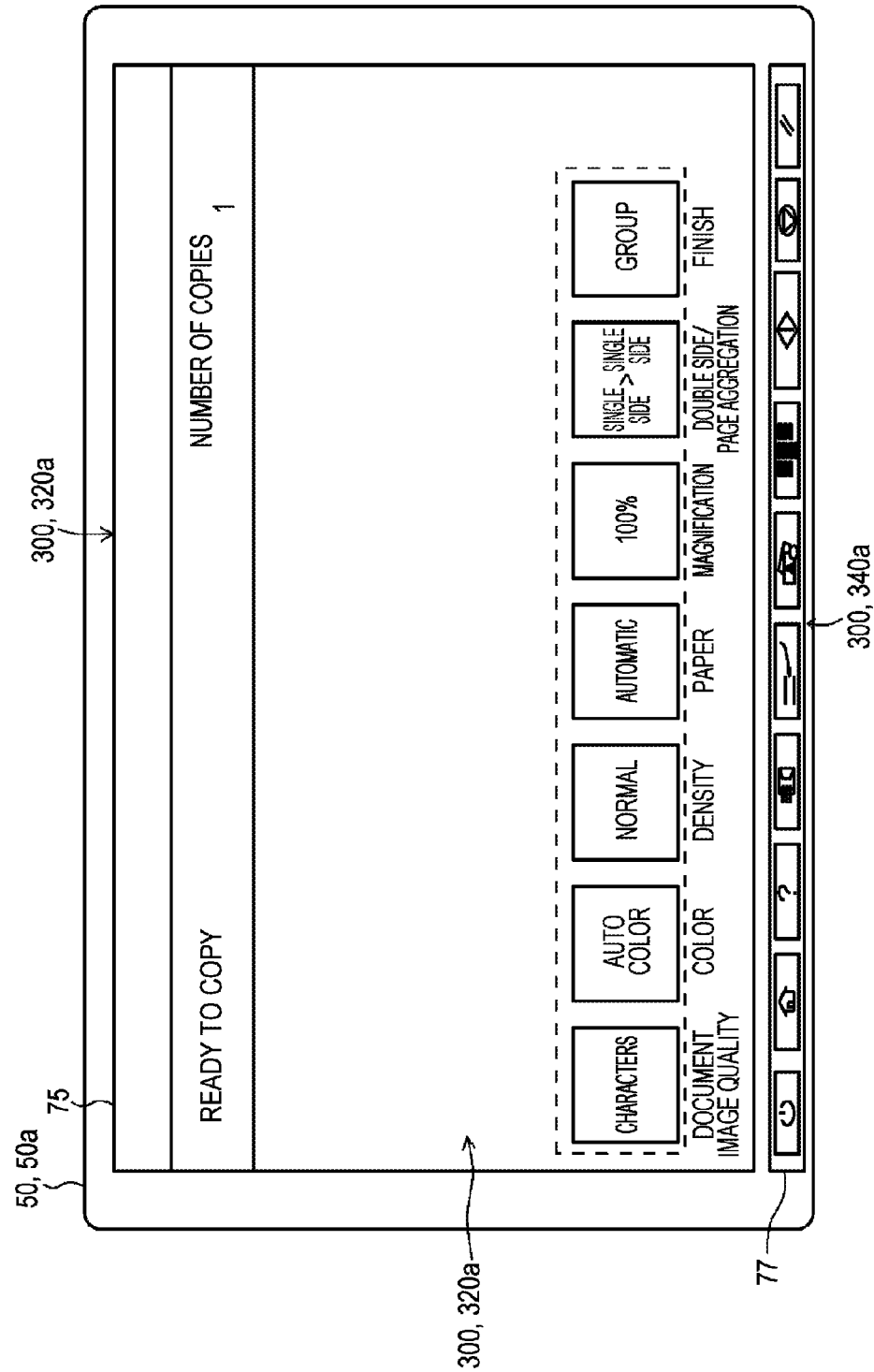
FIG. 5 is a front view of a mobile terminal having a plurality of display units.
Figure 6:
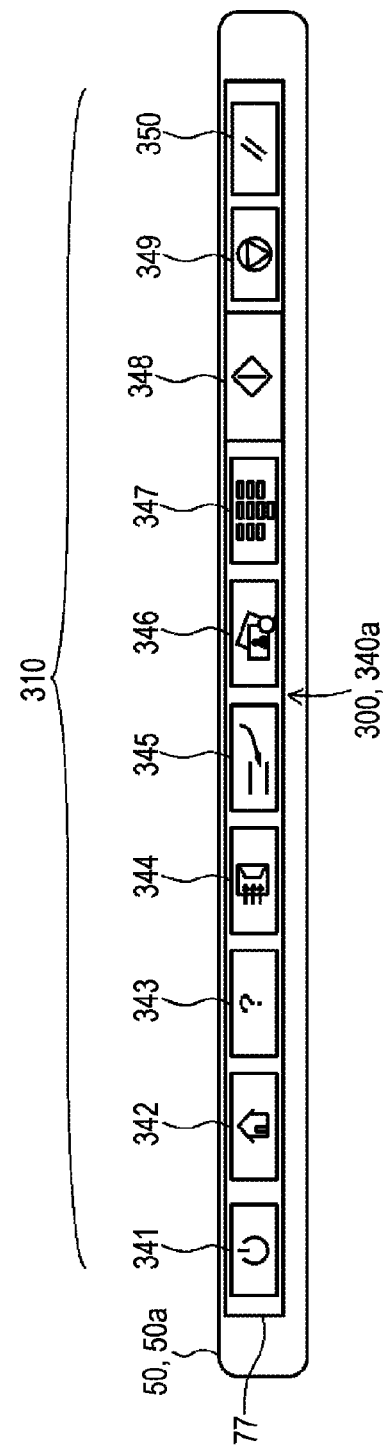
FIG. 6 is a side view of the mobile terminal.

Specifically, when the mobile terminal 50 has two touch panels, two different operation images 300 (320 and 340) are displayed on the mobile terminal 50. For example, as illustrated in FIG. 5, when a mobile terminal 50a has two touch panels 75 and 77, two different operation images 320 (320a) and 340 (340a) are displayed on the mobile terminal 50a. FIG. 5 is a front view of the mobile terminal 50a. FIG. 5 illustrates the operation image 320a (first image) displayed on the touch panel 75 of the mobile terminal 50a and the other operation image 340a (second image) on the other touch panel 77 of the mobile terminal 50a. FIG. 6 is a side view of the mobile terminal 50a. FIG. 6 illustrates the state in which the operation image 340a is displayed on the touch panel 77.

In this example, the operation image 340a is an image having a plurality of hardware key images 310 (341 to 350) (see FIG. 6 and others). The plurality of hardware key images 310 corresponds to the plurality of hardware keys 210 provided at the operation unit 6 of the MFP 10. For example, the hardware key image 341 corresponds to the power key (sub-power key) 201. The hardware key images 342, 343, 344, 345, and 346 correspond to the menu key 211, the guide key 212, the ID key 213, the interrupt key 214, and the preview key 215, respectively. The hardware key images 348, 349, and 350 correspond to the start key 205, the stop key 206, and the reset key 207, respectively. The hardware key image 347 corresponds to a numeric keypad provided at the operation unit of the MFP 10. The numeric keypad is hidden behind the touch panel 25 of the MFP 10, for example. The numeric keypad appears by sliding a slide member (with the touch panel 25) of the operation unit 6.

When one of the plurality of hardware key images 341 to 350 is pressed (for example, tapped once), it is determined that the same instruction as the instruction given by the press of the hardware key corresponding to the key image is provided. That is, the user of the mobile terminal 50 can provide the same instruction as the instruction given with the hardware key 210 of the MFP, through remote operation with the hardware key image 310 (341 to 350).

As in the foregoing, when the mobile terminal 50 (for example, 50a) has the two touch panels 75 and 77, the two touch panels 75 and 77 display individually the two different operation images 320 and 340.

Meanwhile, the mobile terminal 50 (for example, 50b) has only the touch panel 75, a composite image of the two operation images 320 and 340 is displayed as a remote operation screen (operation image) on the mobile terminal

Figure 7:
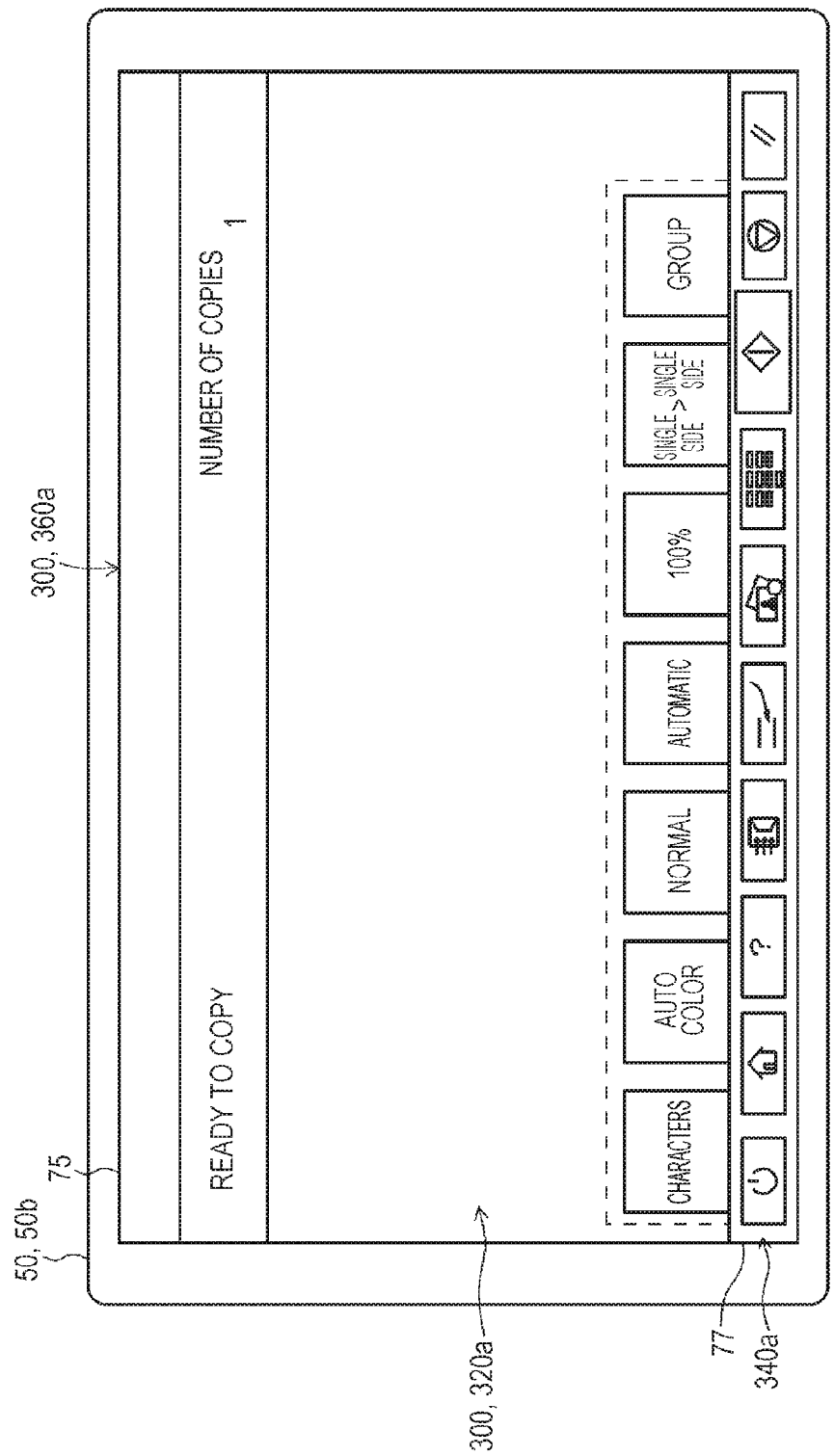
FIG. 7 is a diagram illustrating a mobile terminal having a single display unit.
Figure 8:
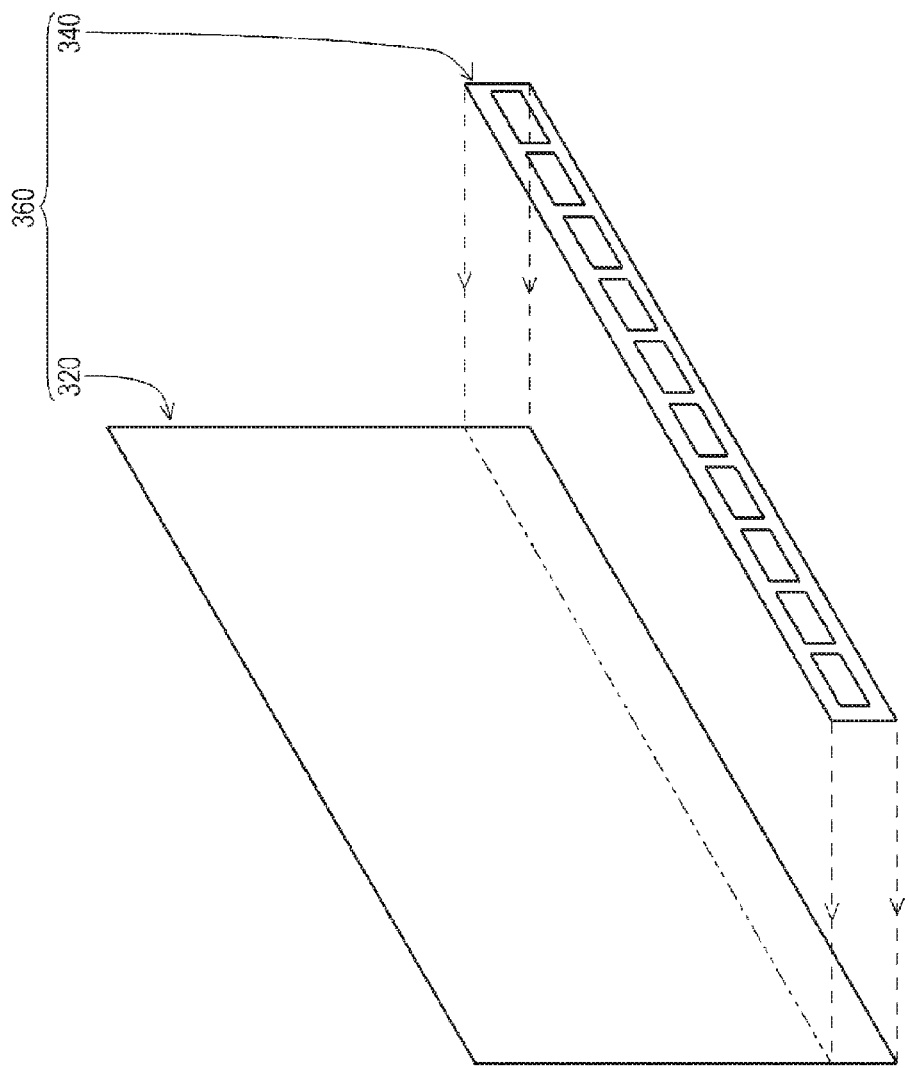
FIG. 8 is a conceptual diagram illustrating composition of two operation images.

50. FIG. 7 illustrates an operation image 360 (360a) according to the composite image on the mobile terminal 50b having the single display unit (touch panel 75). The operation image (composite image) 360 (360a) is formed by compositing the two operation images 320 (320a) and 340 (340a) (see FIG. 8). FIG. 8 illustrates the state in which the two operation images 320 and 340 are composited to generate the operation image 360.

According to this mode, when the mobile terminal 50a has the two touch panels 75 and 77, the two operation images 320a and 340a are individually displayed on the two touch panels 75 and 77 (see FIG. 5 and others). The operation image 340 is not superimposed on the operation image 320 on the touch panel 75, and it is possible to suppress degradation in visibility resulting from the superimposition.

In particular, as compared to the case where the operation image 360 according to the composite image (see FIG. 7) is constantly displayed regardless of the number of the display units of the mobile terminal 50, it is possible to use effectively the plurality of display units of the mobile terminal.

According to this embodiment, it is possible to use effectively the plurality of touch panels 75 and 77 of the mobile terminal 50 and suppress degradation in visibility resulting from the superimposition.

This mode will be further described below in detail.

<1-6. Operations>

Figure 9:
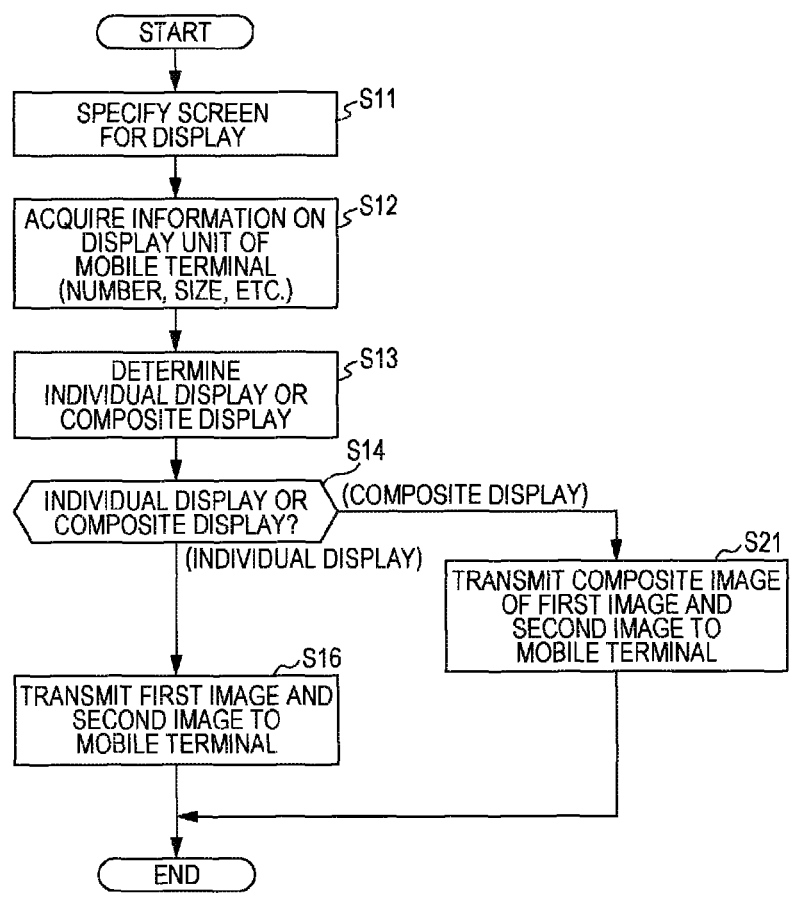
FIG. 9 is a flowchart of operations of the image forming apparatus.
Figure 10:
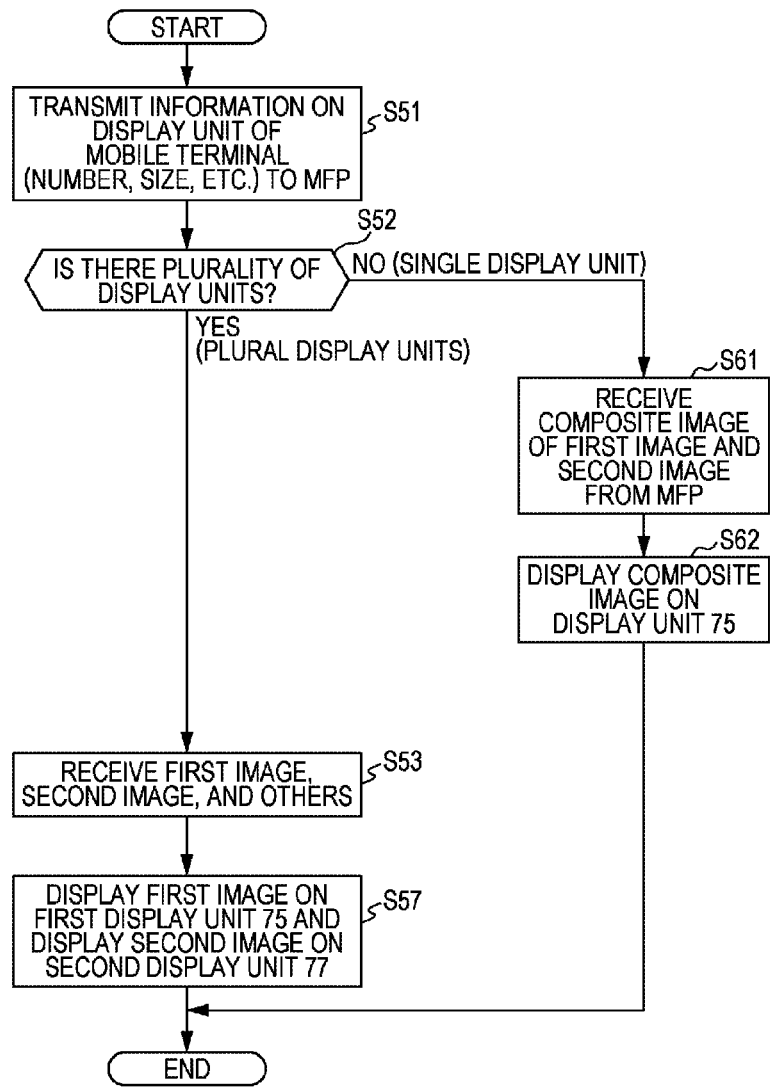
FIG. 10 is a flowchart of operations of the mobile terminal.
Figure 11:
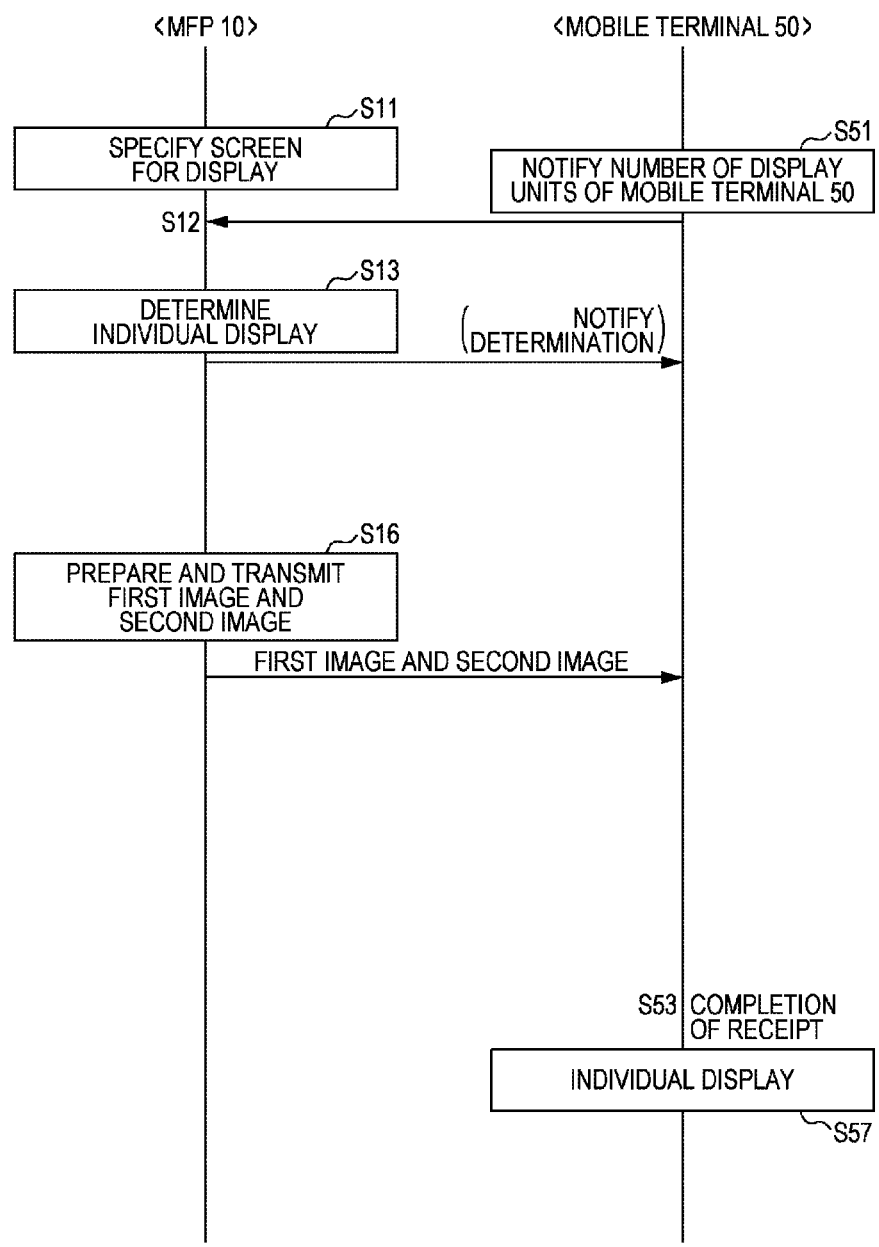
FIG. 11 is a timing chart illustrating an example of operations in the image forming system.

FIG. 9 is a flowchart of operations of the MFP 10. FIG. 10 is a flowchart of operations of the mobile terminal 50. FIG. 11 is a timing chart illustrating an example of operations in the image forming system 1.

After communication connection is established between the MFP 10 and the mobile terminal 50 and a login operation or the like is performed, at step S11, the MFP 10 specifies the image to be displayed (display target image) on the mobile terminal 50 as the operation image (remote operation screen) of the MFP 10, based on the operation image 220 and others displayed on the touch panel 25.

It is assumed here that the operation image 220a as illustrated in FIG. 4 is displayed on the touch panel 25 of the MFP 10. In this case, the MFP 10 first decides the same image 320a (see FIG. 5) as the operation image 220a as the operation image to be displayed on the mobile terminal 50. In other words, the MFP 10 first decides the image 320a (identical to the image 220a) (see FIG. 5) corresponding to the operation screen (operation image) 220a displayed on the operation unit 6 (specifically, the touch panel 25) of the MFP 10 as the operation image to be displayed on the mobile terminal 50. Further, the MFP 10 also decides the image 340 (340a) (see FIG. 6) as the operation image to be displayed on the mobile terminal 50. The image 340a includes the plurality of hardware key images 341 to 350. As described above, the plurality of hardware key images 341 to 350 corresponds to the plurality of hardware keys in the operation unit 6 of the MFP 10.

In this manner, the MFP 10 specifies the plurality of images (including the two operation images 320 and 340) as the operation images.

At step S12, the MFP 10 communicates with the mobile terminal 50 to acquire information related to the display units of the mobile terminal 50 (the number of the display units (for example, two units) and the number of pixels (for example, 1200×800 pixels) of the display units). More specifically, the mobile terminal 50 transmits the information to the MFP 10 (step S51 (see FIG. 10)), and the MFP 10 receives and acquires the information from the mobile terminal 50.

At step S13, the MFP 10 decides the display mode ("individual display"/"composite display" (described later)) of the connected mobile terminal 50, based on the results of the specification at step S11 and the information acquired at step S12 (more specifically, the information on the number of the display units of the mobile terminal 50). Then, the MFP 10 notifies the decision to the mobile terminal.

Specifically, when two images (for example, 320 and 340) are specified as operation images at step S11 and the number of the display units of the mobile terminal 50 is recognized as two or more, the MFP 10 decides that the two images are to be individually displayed on two display units (for example, 75 and 77) of the plurality of display units of the mobile terminal 50 ("individual display"). More specifically, the MFP 10 decides that the operation image 320 is to be displayed on the touch panel 75 and the operation image 340 is to be displayed on the touch panel 77, based on the sizes (the numbers of pixels) of the two operation images 320 and 340 and the sizes (the numbers of pixels) of the touch panels 75 and 77. In other words, the MFP 10 decides that, out of the two images 320 and 340, the relatively large operation image 320 is to be displayed on the touch panel 75 (out of the two touch panels 75 and 77, the relatively large touch panel), and the operation image 340 (the relatively small image) smaller than the operation image 320 is to be displayed on the touch panel 77 (the relatively small display unit) smaller than the touch panel 75. Then, the MFP 10 transmits a display instruction describing the decision (notification of decision) to the mobile terminal 50.

When two images are specified as operation images at step S11 and the mobile terminal 50 is recognized as having only one display unit, the MFP 10 decides that the composite image 360 of the two images 320 and 340 is to be displayed on the single display unit (for example, the touch panel 75) of the mobile terminal 50 ("composition display"). Then, the MFP 10 transmits a display instruction describing the decision (notification of decision) to the mobile terminal 50.

In addition, when the mobile terminal 50 has three display units (touch panels 75, 77, and 79 (not illustrated)) and two images are specified as display target images (operation images), the MFP 10 may decide that the two images are to be individually displayed on two display units (touch panels 75 and 77) out of the plurality of display units of the mobile terminal 50. At that time, one of the two images may be displayed on the remaining display unit (touch panel 79). For example, the MFP 10 may decide that the operation image 320 is to be displayed on the touch panel 75 and the operation image 340 is to be displayed on both the touch panels 77 and 79. Alternatively, the MFP 10 may determine that a composite image of the two images is to be displayed on the remaining display unit (touch panel 79) or none of the images is to be displayed on the remaining display unit (touch panel 79).

At step S14, the MFP 10 performs a branched process based on the result of the decision at step S13.

When deciding that "composition display" (also called composite display decision) is to be performed, the MFP 10 moves the process from step S14 to step S21. At step S21, the MFP 10 generates the composite image 360 of the two images 320 and 340, and transmits the composite image 360 to the mobile terminal 50 (for example, 50b). The mobile terminal 50 (50b) determines at step S52 (see FIG. 10) that the mobile terminal 50 has the single display unit, and moves to step S61. Then, the mobile terminal 50 receives from the MFP 10 the result of the decision that "composite display" is to be performed and the composite image 360

(360a) (step S61). Accordingly, as illustrated in FIG. 7, the composite image 360 (360a) is displayed on the touch panel 75 (step S62).

In contrast, when deciding that "individual display" is to be performed (also called individual display decision), the MFP 10 moves the process from step S14 to step S16. At step S16, the MFP 10 prepares two images 320 and 340 and transmits the two operation images 320 and 340 to the mobile terminal 50 (for example, 50a). In this example, the operation images 320 and 340 are stored in advance in the storage unit 5 of the MFP 10, and the MFP 10 prepares the same by extracting from the storage unit 5.

The mobile terminal 50 (for example, 50a) determines at step S52 (see FIG. 10) that the mobile terminal 50 has a plurality of display units, and moves from step S52 to step S53. The mobile terminal 50 receives from the MFP 10 the result of the decision that "individual display" is to be performed and the two images 320 and 340 (step S53 (see FIGS. 10, 11, and others)), and displays the two images 320 and 340 individually on the touch panels 75 and 77 (step S57). Specifically, as illustrated in FIG. 5, the MFP 10 displays the operation image 320 (320a) on the touch panel 75 and displays the operation image 340 (340a) on the touch panel 77 (step S57).

After that, the mobile terminal 50 accepts a user operation on the touch panels 75 and 77, and transmits the contents of the operation to the MFP 10. More specifically, the mobile terminal 50 transmits to the MFP 10 the information indicating on which of the operation images 320 and 340 the operation was performed and the coordinate information on the position of the operation (pressed position). The coordinate information is preferably transmitted after the MFP 10 performs a coordinate conversion process on the coordinate system. The MFP 10 comprehends the contents of the remote operation by the mobile terminal 50 based on the received information and executes a process corresponding to the contents of the remote operation.

According to the foregoing mode, when a plurality of images including the two images 320 and 340 is specified as operation images and the mobile terminal 50 has two or more display units, the MFP 10 transmits a display instruction for individual display to the mobile terminal 50. Specifically, the MFP 10 transmits a display instruction for displaying the two operation images 320 and 340 individually on two different touch panels (display units) 75 and 77 out of the plurality of display units of the mobile terminal 50. In response to the display instruction, the two operation images 320 and 340 are displayed individually on the two touch panels 75 and 77. The operation image 340 is not superimposed on the operation image 320 on the touch panel 75, and it is possible to suppress degradation in visibility resulting from the superimposition. It is also possible to use effectively the plurality of display units of the mobile terminal 50.

2. Second Embodiment

In the first embodiment, both the operation image 320 and the operation image 340 are always prepared at the MFP 10, but the present invention is not limited to this. For example, the operation image 340 may be generated and prepared by the mobile terminal 50 immediately before the transmission at step S16. Alternatively, the device to prepare the operation image 340 may be changed in a determination process under a predetermined criterion. When the mobile terminal 50 is to prepare the operation image 340, information for generating the operation image 340 at the mobile terminal 50 may be transmitted from the MFP 10 to the mobile terminal 50 as described later.

In relation to a second embodiment, the mode in which the MFP 10 determines the device to prepare the operation image 340 (second image) will be described in detail. In the second embodiment, the MFP 10 decides the device to prepare the operation image 340 based on the speed of network communication (network communication speed) between the MFP 10 and the mobile terminal. Hereinafter, the differences of this mode from the first embodiment will be mainly described.

Figure 12:
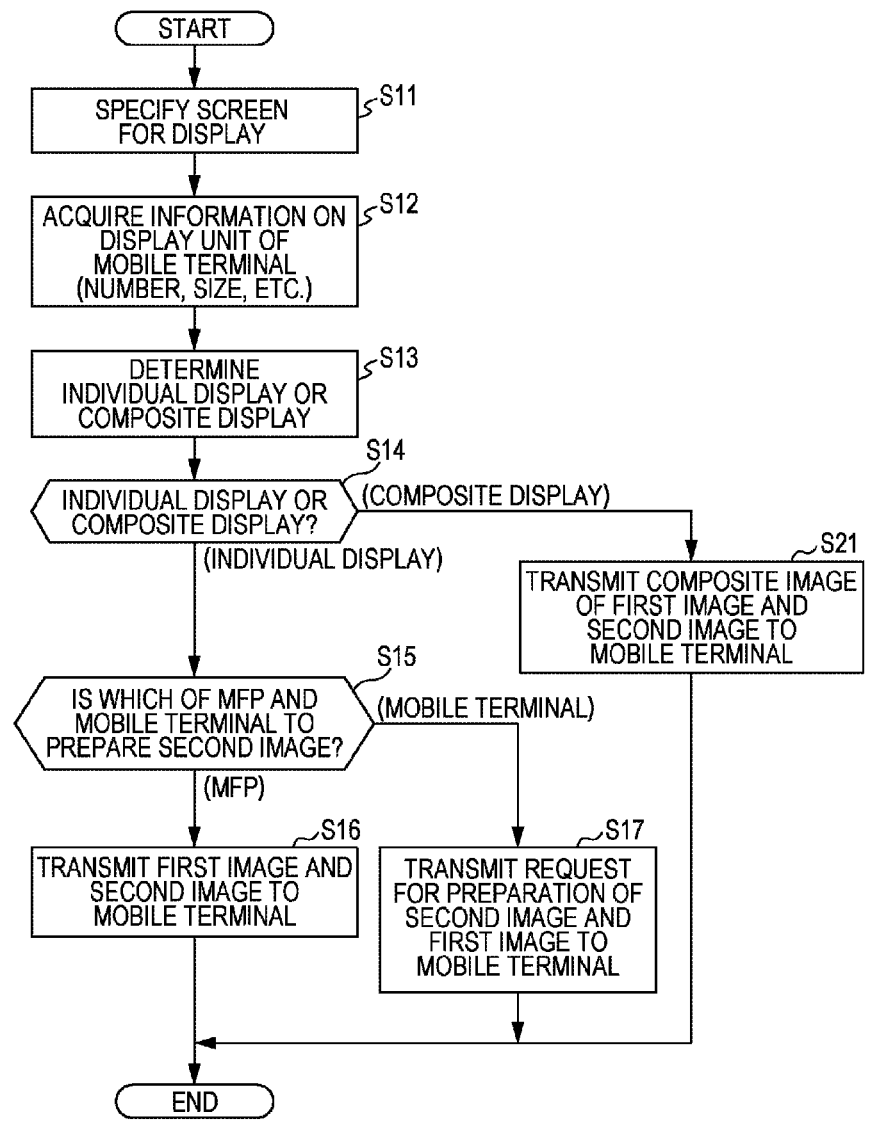
FIG. 12 is a flowchart of operations of an image forming apparatus according to a second embodiment.
Figure 13:
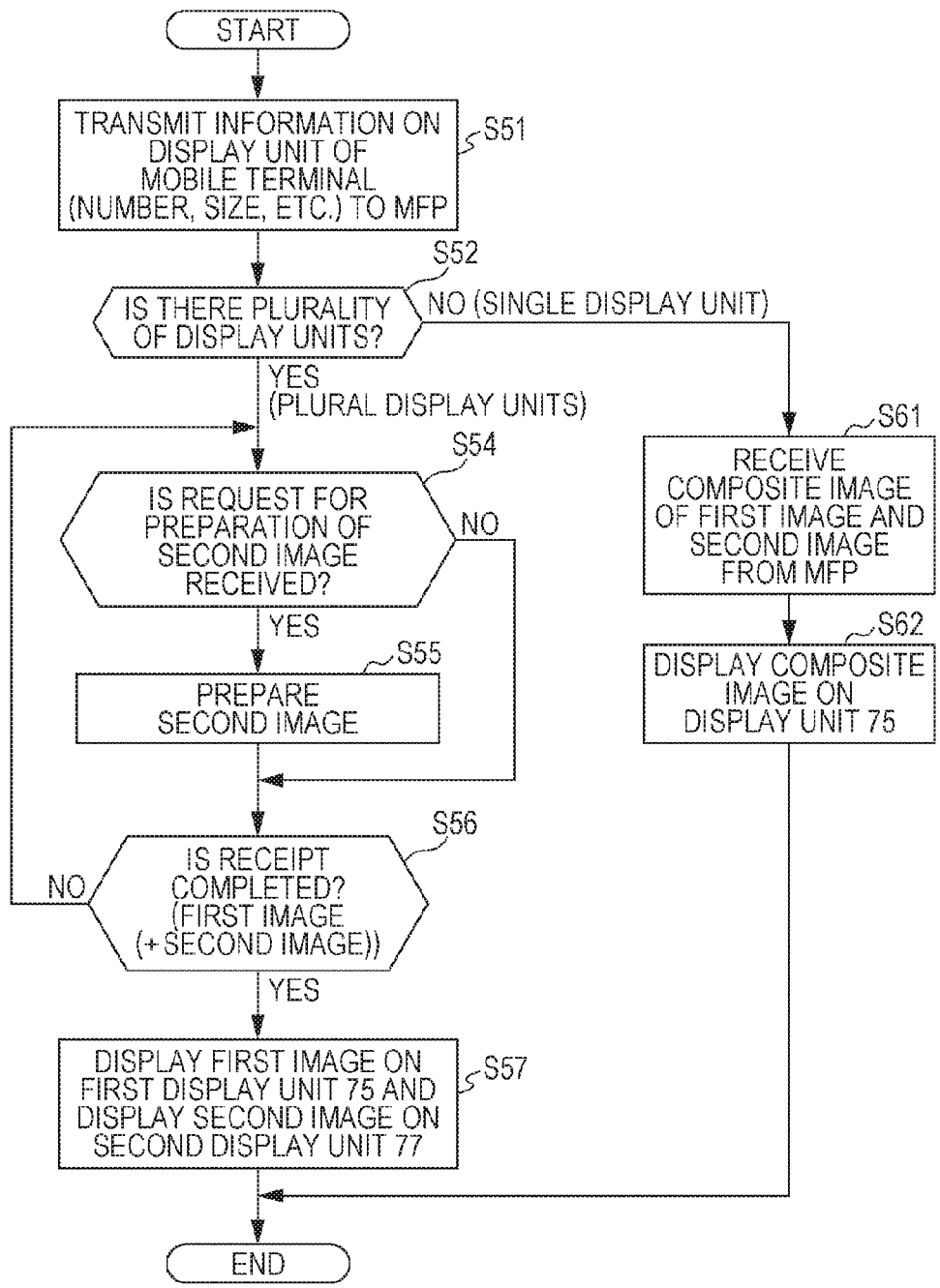
FIG. 13 is a flowchart of operations of a mobile terminal according to the second embodiment.
Figure 14:
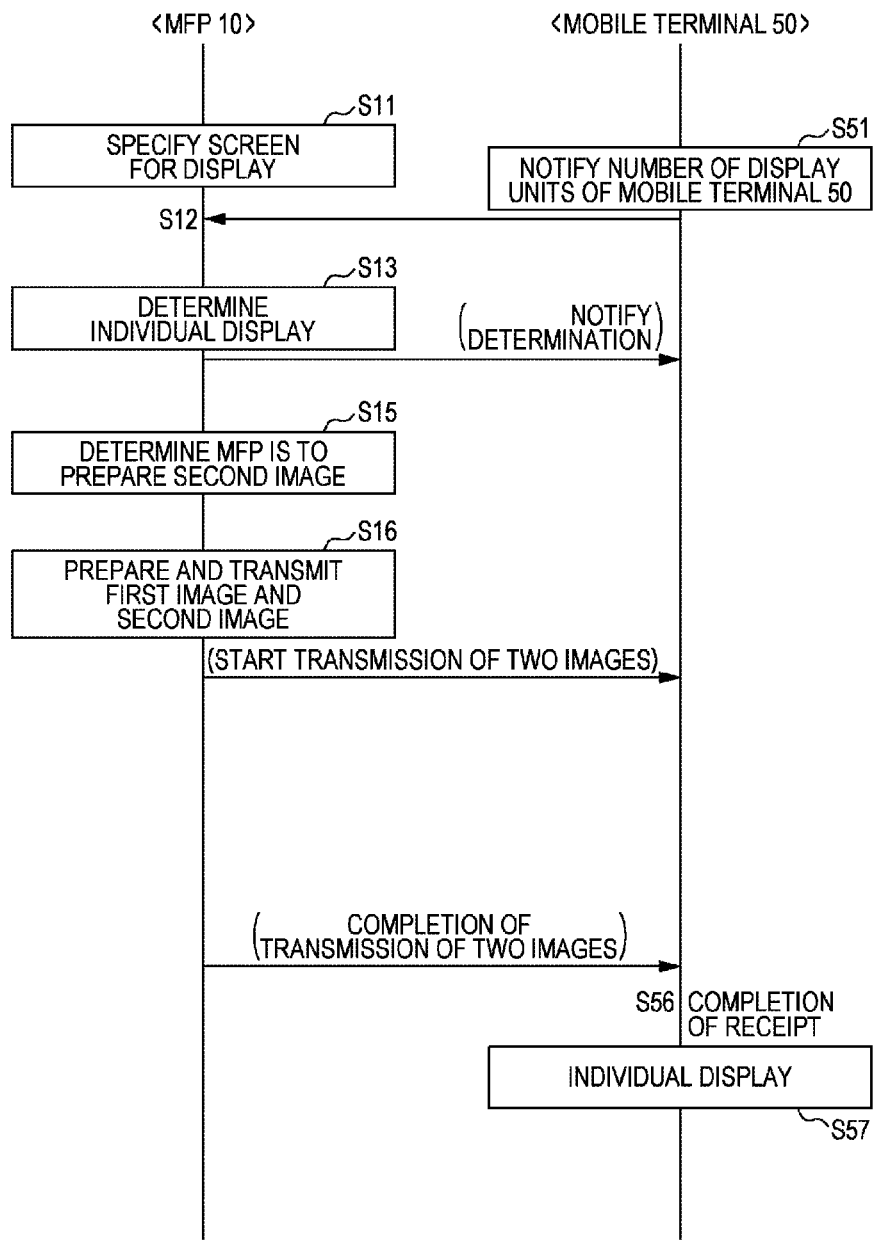
FIG. 14 is a timing chart illustrating an example of operations in an image forming system according to the second embodiment.
Figure 15:
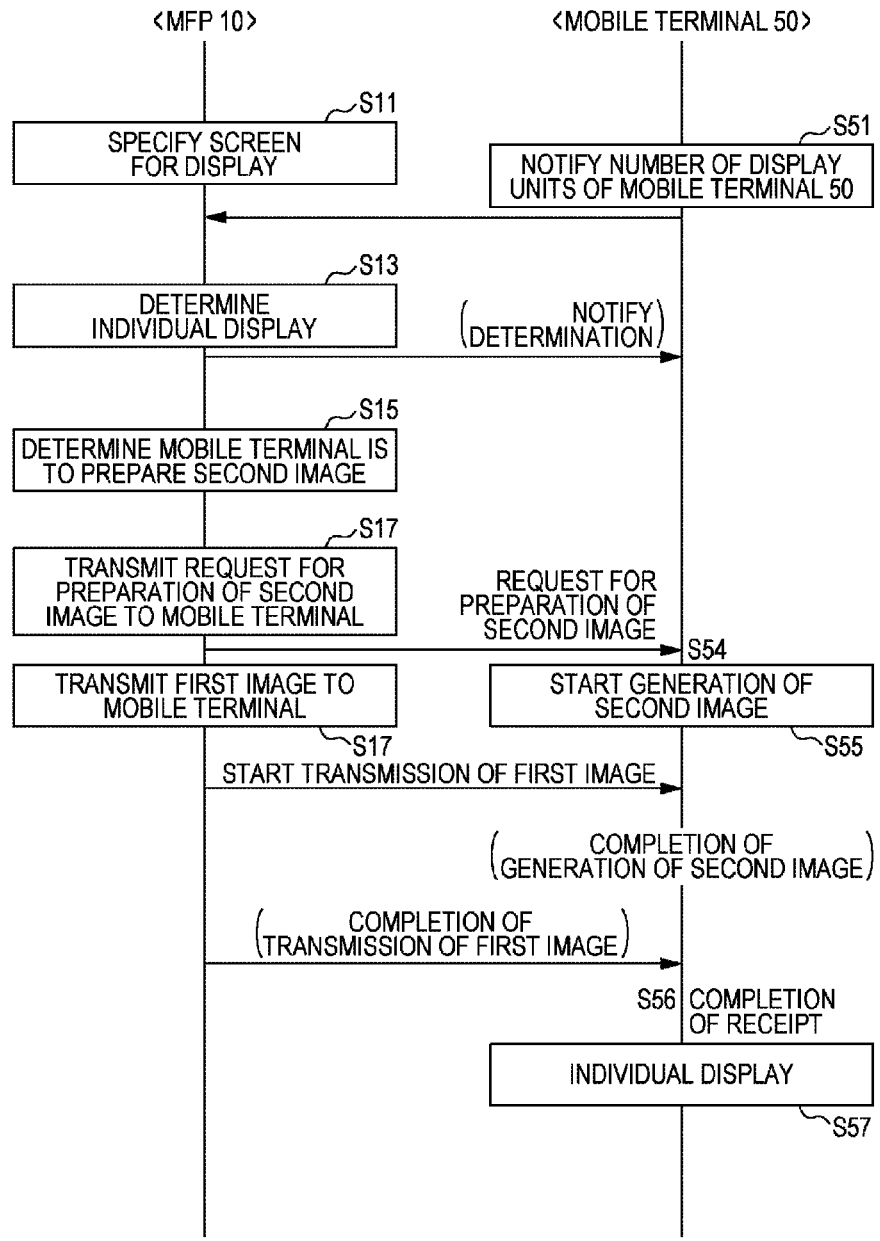
FIG. 15 is a timing chart illustrating another example of operations.
Figure 16:
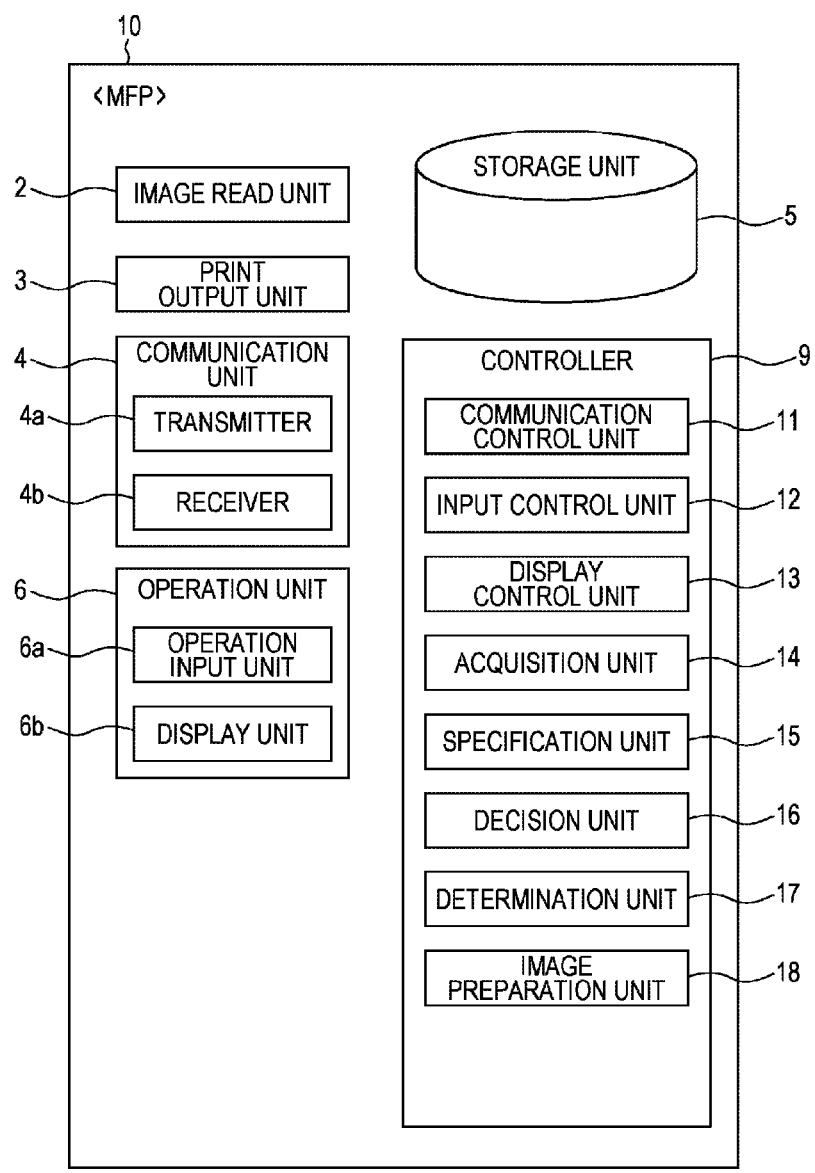
FIG. 16 is a diagram illustrating functional blocks of the image forming apparatus according to the second embodiment.
Figure 17:
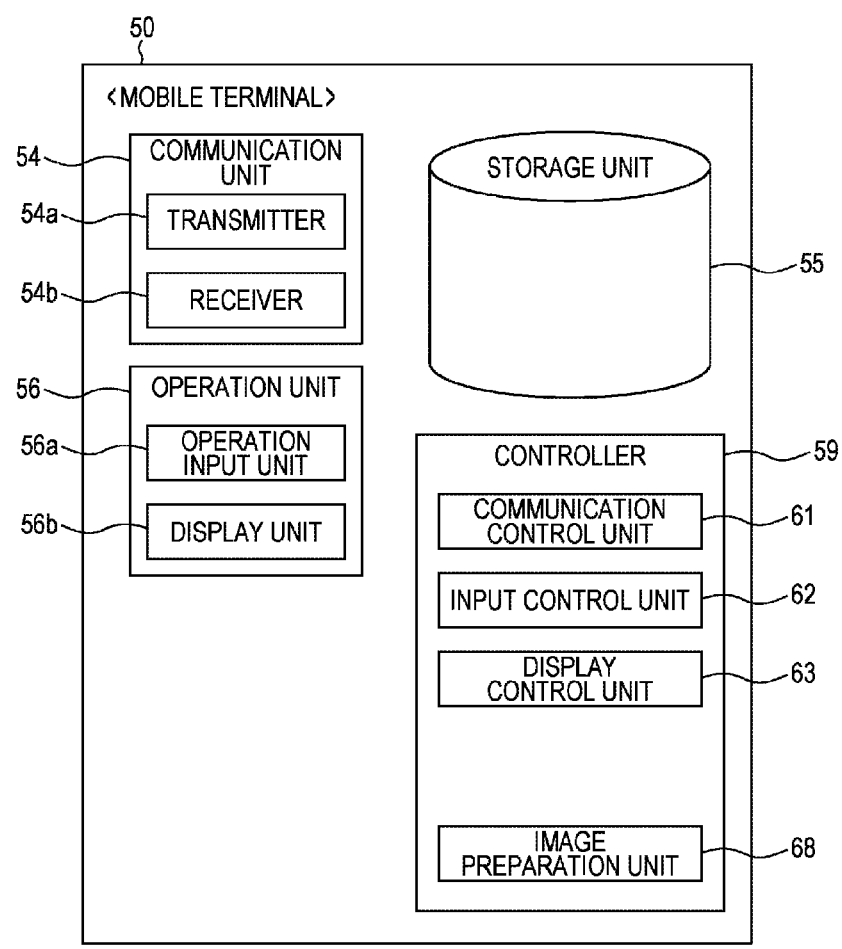
FIG. 17 is a diagram illustrating functional blocks of the mobile terminal according to the second embodiment.

FIG. 12 is a flowchart of operations of the MFP 10 according to the second embodiment. FIG. 13 is a flowchart of operations of the mobile terminal 50 according to the second embodiment. FIG. 14 is a timing chart illustrating an example of operations (when the MFP 10 prepares the operation image 340) in the image forming system 1 according to the second embodiment. FIG. 15 is a timing chart illustrating another example of operations (when the mobile terminal 50 prepares the operation image 340). FIG. 16 is a diagram illustrating functional blocks of the MFP 10 according to the second embodiment. FIG. 17 is a diagram illustrating functional blocks of the mobile terminal 50 according to the second embodiment. As illustrated in FIG. 16 and FIG. 17, in the second embodiment, the MFP 10 further includes a determination unit 17, and the mobile terminal 50 further includes an image preparation unit 68.

Referring to FIG. 12, steps S15 to S17 are different from the corresponding steps described in FIG. 9, and referring to FIG. 13, steps S54 to S56 are different from the corresponding steps described in FIG. 10.

The MFP 10 (determination unit 17 (see FIG. 16)) determines at step S15 described in FIG. 12 which of the MFP 10 and the mobile terminal 50 to prepare the operation image 340. In this example, the MFP 10 determines which of the devices to prepare the operation image 340 based on the status of the network (the speed of network communication between the MFP 10 and the mobile terminal). More specifically, when the speed of network communication between the MFP 10 and the mobile terminal is higher than a predetermined level (in other words, when communication can be performed between the MFP 10 and the mobile terminal 50 at a higher speed than a predetermined level), the MFP 10 determines that the MFP 10 itself is to prepare the operation image 340. In contrast, when the network communication speed is lower than the predetermined level (in other words, when communication can be performed between the two devices 10 and 50 at a lower speed than the predetermined level), the MFP 10 decides that the mobile terminal 50 is to prepare the operation image 340.

When determining that the MFP 10 itself is to prepare the operation image 340, the MFP 10 moves to step S16. The operation at step S16 is the same as that in the first embodiment. At step S16, the MFP 10 transmits the pre-generated operation images 320 and 340 to the mobile terminal 50 (see also FIG. 14). In this case, step S17 is not performed or no request for preparation of the operation image 340 is transmitted to the mobile terminal.

The mobile terminal 50 receives the operation images 320 and 340 from the MFP 10 in the loop process (receiving process) at steps S54 to S56 (step S56), and displays the operation image 320 on the touch panel 75 and displays the operation image 340 on the touch panel 77 as illustrated in FIG. 5 and others (step S57). In this case, no request for preparation of the operation image 340 is received or step S55 (described later) is not executed (in response to completion of receipt of the operation image 320). The MFP 10 moves the process to step S57.

In contrast, when determining that the mobile terminal 50 is to prepare the operation image 340, the MFP 10 moves from step S15 to step S17. At step S17, the MFP 10 transmits only the operation image 320 out of the two operation images 320 and 340 to the mobile terminal 50, and also transmits a request for preparation of the other operation image 340 to the mobile terminal 50. At that time, the MFP 10 preferably transmits the request for preparation of the operation image 340 to the mobile terminal 50 prior to the transmission of the operation image 320, so that the mobile terminal 50 can start to generate the operation image 340 at a relatively early stage (see FIG. 15).

Upon receipt of the request for preparation of the operation image 340 in the loop process (receiving process) at steps S54 to S56, the mobile terminal 50 determines at step S54 that the request for preparation of the operation image 340 has been received, and then moves to step S55. The mobile terminal 50 executes in parallel the process for receiving the operation image 320 and a process for generating the operation image 340 (step S55) described next.

At step S55, the mobile terminal 50 (specifically, image preparation unit (also called image generation unit) 68 (see FIG. 17)) executes the process for preparation (generation) of the operation image 340 according to the request for preparation of the operation image 340. The request for preparation includes information for preparation of the operation image 340 (information for generation of the second image), and the information for generation includes various kinds of information for use in generation of the operation image 340. As illustrated in FIG. 18, the information for generation includes information related to element IDs, positions (X, Y), sizes (W (width) and H (height)) and others of a plurality of item elements (in this example, image elements (the plurality of hardware key images 341 to 350 included in the operation image 340)). The positions and sizes are information related to the operation image 340 of a basic size.

The mobile terminal 50 stores in advance in the storage unit 55 a model image (template image) 370 and a plurality of component images 371 372, 373, . . . for the operation image 340. The model image (template image) 370 (see FIG. 19) is image data defining the outer shape and others of the operation image 340, and the plurality of component images 371, 372, 373, . . . (see FIG. 19) are image data of component elements. In response to the request for preparation, the mobile terminal 50 extracts the element IDs from the information for generation included in the request for preparation, and extracts the component images corresponding to the element IDs from the storage unit 55. The mobile terminal 50 also adjusts the positions and the sizes of the component images based on the position information (X, Y) and the size information (W and H) included in the information for generation, the ratio of the basic size of the operation image to the size of the touch panel 77 (the number of pixels), and others, and superimposes the component images on the template image. More specifically, the mobile terminal 50 arranges horizontally the plurality of component images (hardware key images) 371, 372, 373, . . . corresponding to the plurality of item elements (item elements for selection) on the template image 370 to generate the operation image 340. In this manner, the mobile terminal 50 prepares the operation image 340.

Figure 19:
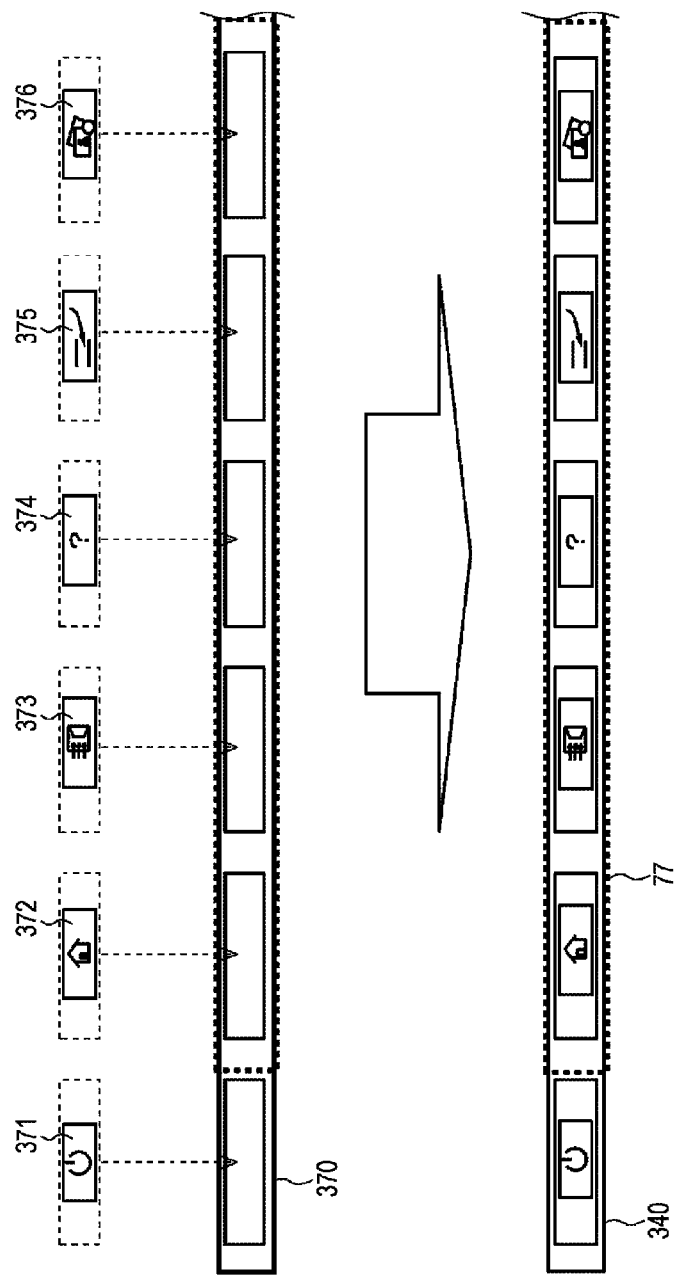
FIG. 19 is a conceptual diagram illustrating generation of the second image.

When determining at step S56 that the process for preparation of the operation image 340 (step S55) is completed and the receipt of the operation image 320 is completed, the mobile terminal 50 moves to step S57. At step S57, the mobile terminal 50 displays the operation image 320 on the touch panel 75 and displays the operation image 340 on the touch panel 77 (see FIG. 5). The operation image 340 illustrated in FIG. 19 is the same in height as the touch panel 77 and is wider than the touch panel 77. The touch panel 77 displays part of the operation image 340 (a display target area (shown by thick broken lines in FIG. 19)) in the width direction. In other words, the touch panel 77 displays selectively few of the relatively large number of item elements. Accordingly, the item elements can be displayed in a relatively large size on the touch panel 77. The target display area of the operation image 340 can be changed according to the user's horizontal (right-and-left) flick operation. That is, the operation image 340 can be horizontally scrolled on the touch panel 77. The user can display desired item elements on the touch panel 77 through the scroll operation.

According to the foregoing operation, the device to prepare the operation image 340 is changed according to the network communication speed, which allows flexible responses to the communication status. In particular, when it is determined that communication can be performed between the MFP 10 and the mobile terminal 50 at a lower speed than a predetermined level, the MFP 10 transmits the information for generation to the mobile terminal 50, and the mobile terminal 50 prepares the operation image 340 based on the information for generation. The information for generation has a smaller data capacity than the operation image 340. Therefore, as compared to the case where the operation image 340 itself is transmitted, it is possible to prevent the data transmission time from becoming longer due to reduction in the network communication speed, and prepare the operation image 340 at an earlier stage. Accordingly, it is possible to display the operation image 340 on the mobile terminal 50 at a relatively early stage and suppress degradation in operability.

3. Third Embodiment

In the first and second embodiments, the MFP 10 decides whether to perform "individual display" or "composite display" on the mobile terminal 50, but the present invention is not limited to this. Alternatively, the mobile terminal 50 may decide whether to perform "individual display" or "composite display" on the mobile terminal 50.

In the second embodiment, the MFP 10 decides the device to prepare the operation image 340, but the present invention is not limited to this. The mobile terminal 50 may decide the device to prepare the operation image 340.

In relation to a third embodiment, the mode with these modifications will be described. Hereinafter, the differences from the second embodiment will be mainly described.

Figure 20:
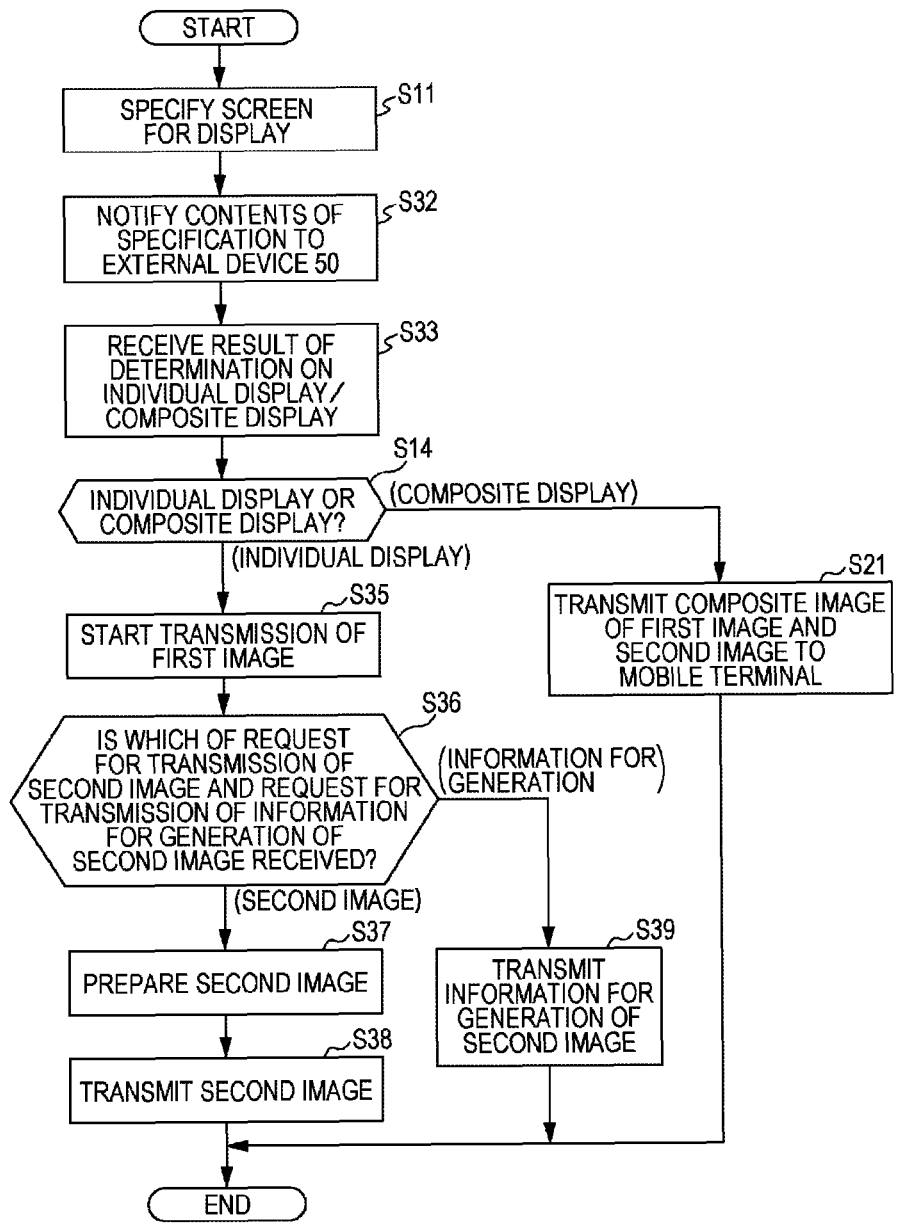
FIG. 20 is a flowchart of operations of an MFP according to a third embodiment.
Figure 21:
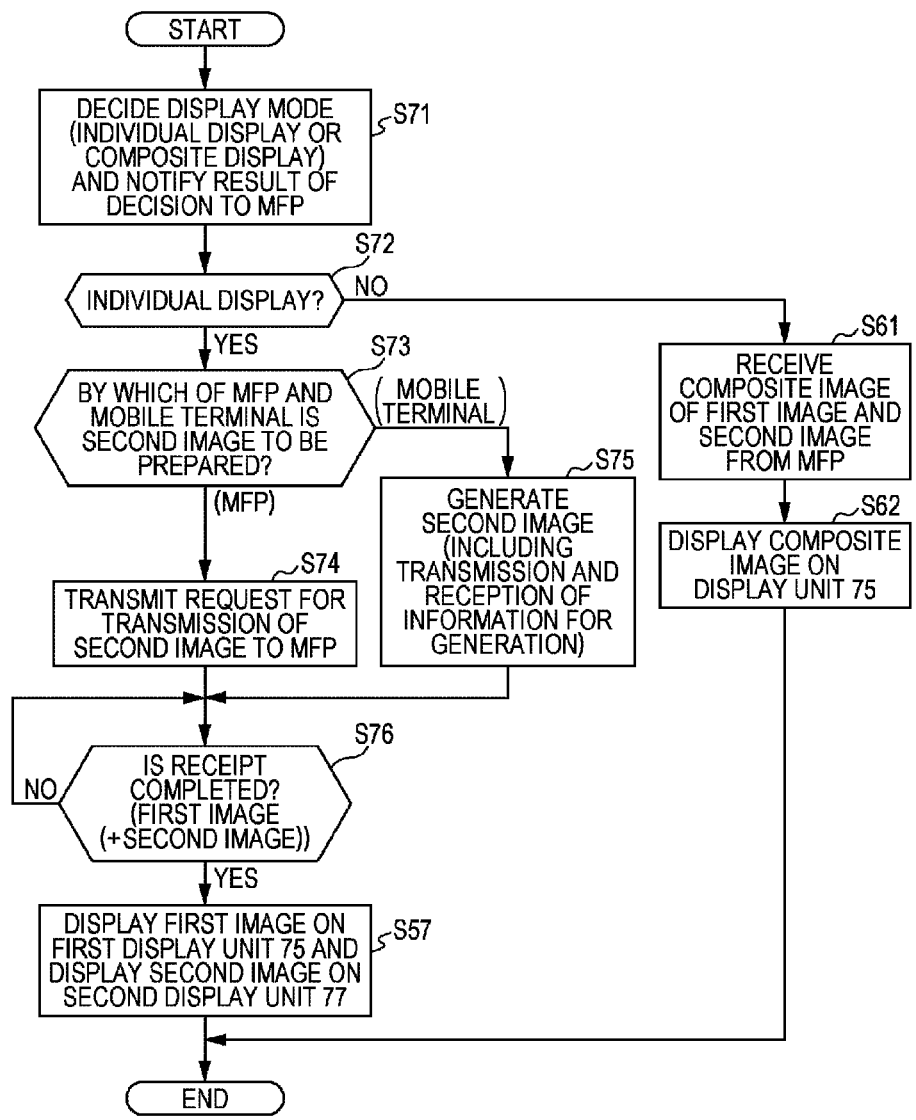
FIG. 21 is a flowchart of operations of a mobile terminal according to the third embodiment.
Figure 22:
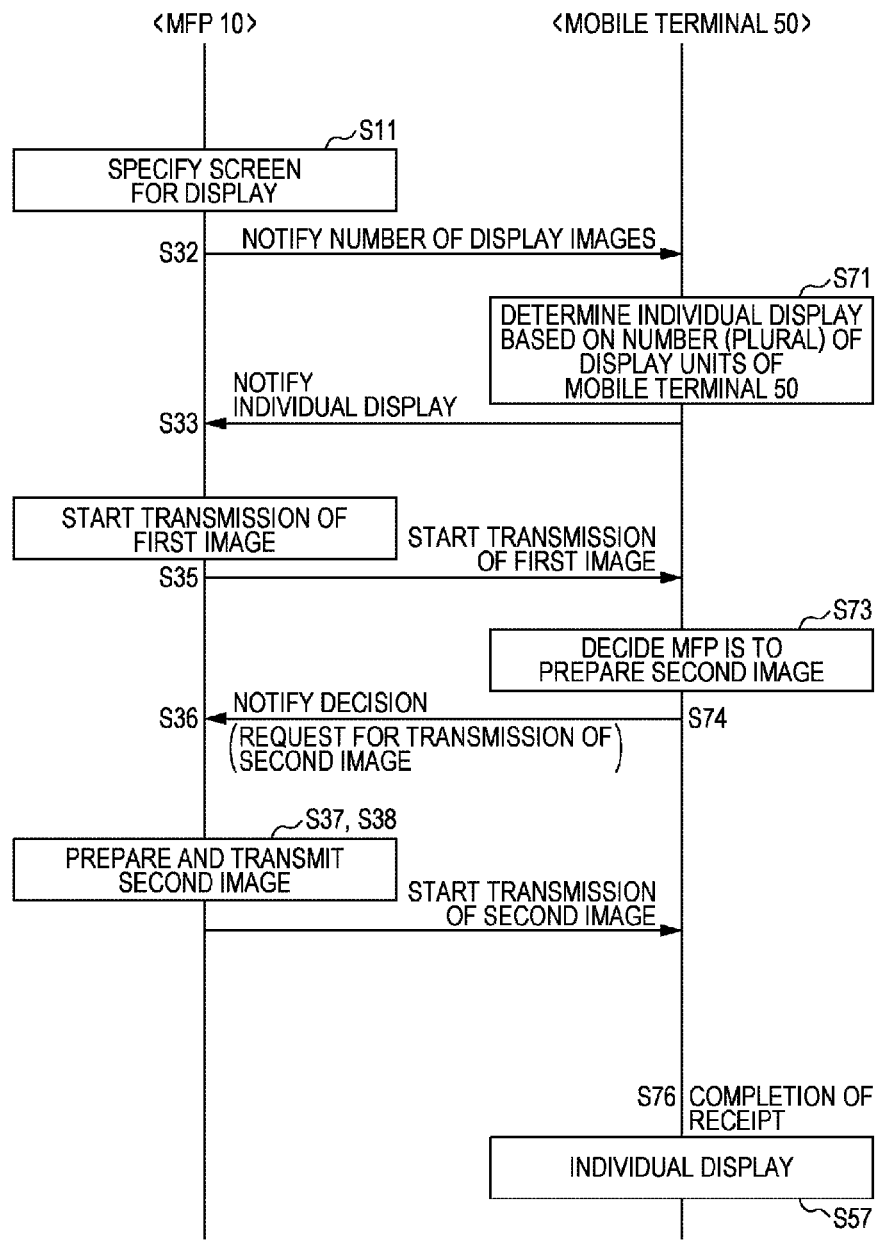
FIG. 22 is a timing chart illustrating an example of operations in an image forming system according to the third embodiment.
Figure 23:
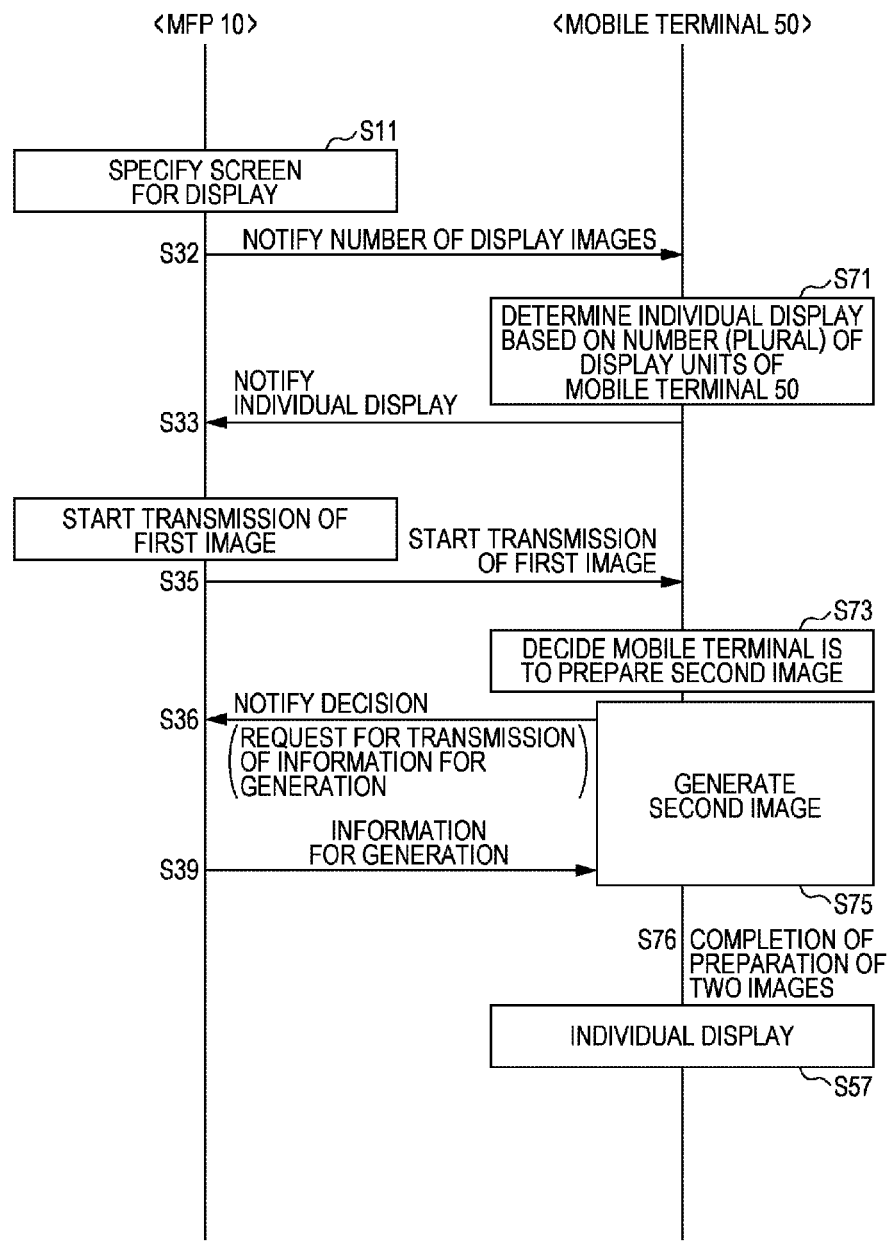
FIG. 23 is a timing chart illustrating another example of operations.
Figure 24:
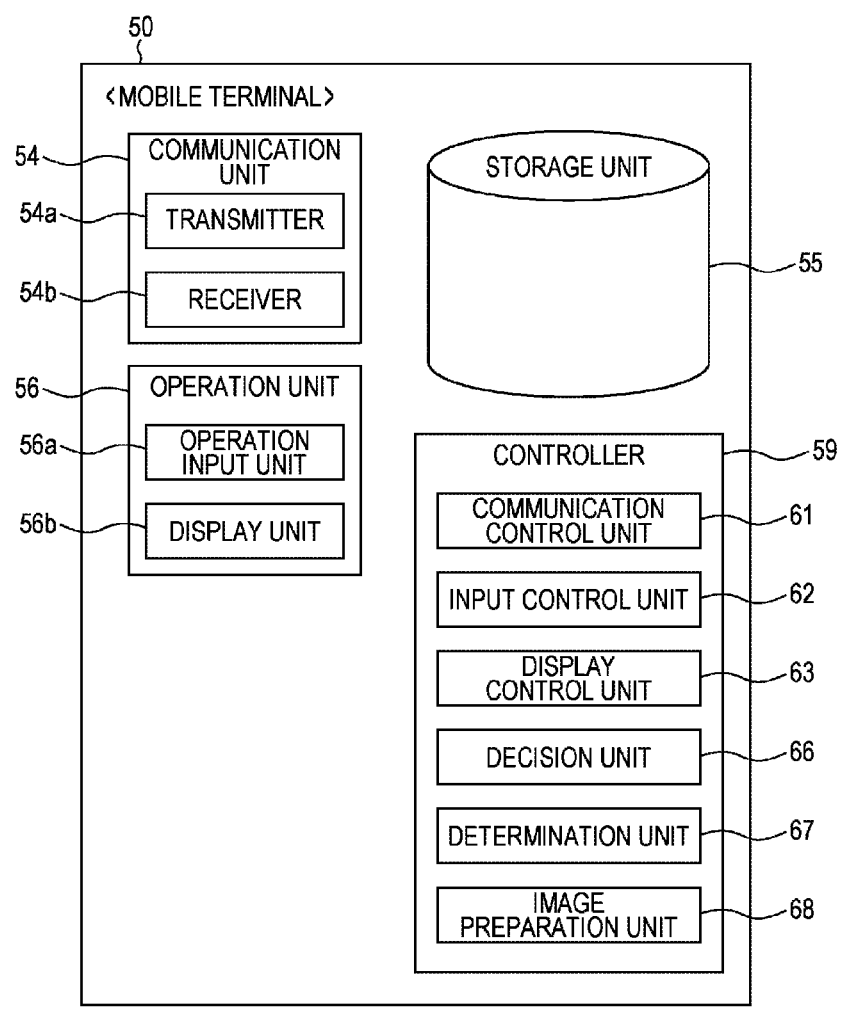
FIG. 24 is a diagram illustrating functional blocks of the mobile terminal according to the third embodiment.

FIG. 20 is a flowchart of operations of the MFP 10 according to the third embodiment. FIG. 21 is a flowchart of operations of the mobile terminal 50 according to the third embodiment. FIG. 22 is a timing chart illustrating an example of operations (when the MFP 10 prepares the operation image 340) in the image forming system 1 according to the third embodiment. FIG. 23 is a timing chart illustrating another example of operations (when the mobile terminal 50 prepares the operation image 340). FIG. 24 is a diagram illustrating functional blocks of the mobile terminal 50 according to the third embodiment. The MFP 10 according to the third embodiment has the same functional blocks as those of the MFP 10 according to the first embodiment (see FIG. 2). However, the MFP 10 does not need to be provided with the decision unit 16. A decision unit 66 of the mobile terminal 50 executes the same process as the process performed by the decision unit 16.

The process flow described in FIG. 20 is different from the process flow described in FIG. 12 in that steps S32 and S33 are executed instead of steps S12 and S13, and steps S35 to S39 are executed instead of steps S15 to S17.

The process flow described in FIG. 21 is different from the process flow described in FIG. 13 in that steps S71 to S76 are executed instead of steps S51 to S56.

As described in FIG. 20, the MFP 10 specifies the operation image to be displayed as the remote operation image of the MFP 10 on the mobile terminal 50 (step S11), and then notifies the specification to the mobile terminal 50 (step S32).

For example, when specifying the two operation images 320 and 340 as operation images, the MFP 10 notifies the mobile terminal 50 that the number of the images to be displayed (display target images) as operation images on the mobile terminal 50 is plural. More specifically, the MFP 10 notifies the mobile terminal 50 that the number of the display target images is plural to allow the mobile terminal 50 to decide whether to display the two images individually on two display units out of the plurality of display units of the mobile terminal 50.

Upon receipt of the information on the number of the display target images from the MFP 10 at steps S71 (see FIG. 21), the mobile terminal 50 decides whether the mobile terminal is to perform "individual display" or "composite display" based on the number of the display units of the mobile terminal 50 and the number of the display target images. The decision process is performed by the decision unit 66 of the mobile terminal 50 (see FIG. 24) or the like.

When the number of the display unit of the mobile terminal 50 is one and the number of the display target images is two, for example, the mobile terminal 50 decides that the composite image of the two images is to be displayed on the single display unit of the mobile terminal 50. Shortly, the mobile terminal 50 decides that "composite display" is to be performed. After that, the mobile terminal 50 notifies the result of the decision to the MFP 10. In this case, the mobile terminal 50 moves from step S72 to steps S61 and S62. Then, the mobile terminal 50 performs the same process as the foregoing process at steps S61 and S62.

When the number of the display units of the mobile terminal 50 is two or more and the number of the display target images is two, the mobile terminal 50 decides that the two images are to be displayed individually on two different display units out of the plurality of display units of the mobile terminal 50. Shortly, the mobile terminal 50 decides that "individual display" is to be performed. Then, the mobile terminal 50 notifies the result of the decision to the MFP 10. In this case, the mobile terminal 50 moves from step S72 to step S73.

At steps S73 to S76, the mobile terminal 50 acquires the two display target images (operation images 320 and 340) (specifically, the image data) based on the decision ("individual display").

More specifically, at step S73, the mobile terminal 50 first determines which of the MFP 10 and the mobile terminal 50 is to prepare the operation image 340 out of the two operation images 320 and 340 based on the speed of network communication between the mobile terminal 50 and the MFP 10. The determination process is executed by the determination unit 67 of the mobile terminal 50 (see FIG. 24) or the like. The determination method is the same as that in the second embodiment. Specifically, when the network communication speed is higher than a predetermined level, the MFP 10 is determined to prepare the operation image 340, and when the network communication speed is lower than the predetermined level, the mobile terminal 50 is determined to prepare the operation image 340.

When determining that the MFP 10 is to prepare the operation image 340, the mobile terminal 50 transmits a request for transmission of the operation image 340 to the MFP 10 (step S74), and receives the operation image 340 (specifically, the image data) from the MFP 10.

In contrast, when determining that the mobile terminal 50 is to prepare the operation image 340, the mobile terminal 50 generates the operation image 340 based on the information for generation (step S75). More specifically, the mobile terminal 50 first transmits a request for transmission of the information for generation of the operation image 340 to the MFP 10, and receives the information for generation from the MFP 10, and then generates the operation image 340 based on the information for generation. For example, the mobile terminal 50 generates the image in which a plurality of item elements included in the information for generation is arranged in a predetermined direction as the operation image 340.

Referring again to FIG. 20, the response operations of the MFP 10 will be described.

Upon receipt of the notification of the decision on whether "individual display" or "composite display" is to be performed (step S71) from the mobile terminal 50 at step S33, the MFP 10 moves to the branched process at step S14.

When receiving the result of the decision that "composite display" is to be performed, the MFP 10 moves from step S14 to step S21, and transmits the composite image 360 to the mobile terminal 50 (step S21). After that, as described above, the mobile terminal 50 receives the composite image 360 (step S61), and displays the composite image 360 on the touch panel 75 (step S62).

In contrast, when receiving the result of the decision that "individual display" is to be performed, the MFP 10 moves from step S14 to step S35, and first starts the transmission of the operation image 320 (first image) (also see FIGS. 22 and 23).

After that, regarding the operation image 340 (second image), the MFP 10 performs the branched process depending on whether which of the request for transmission of the operation image 340 or the request for transmission of the information for generation of the operation image 340 has been received (step S36).

When the request for transmission of the information for generation of the operation image 340 has been received, the MFP 10 transmits the information for generation to the mobile terminal 50 (step S39) (also see FIG. 23).

In contrast, when the request for transmission of the operation image 340 has been received, the MFP 10 prepares the operation image 340 (step S37) and transmits the operation image 340 (step S38) (also see FIG. 22).

Referring again to FIG. 21, when determining at step S76 described in FIG. 21 that the receipt of the operation image 320 is completed and the receipt of the operation image 340 or the generation of the operation image 340 is completed, the mobile terminal 50 moves to step S57. At step S57, the mobile terminal 50 displays the two operation images 320 and 340 individually on the touch panels 75 and 77. More specifically, the mobile terminal 50 displays the operation image 320 on the touch panel 75 and displays the operation image 340 on the touch panel 77.

By the foregoing operations, the same advantages as those of the second embodiment can be obtained.

In the third embodiment, the mobile terminal 50 decides whether "individual display" or "composite display" is to be performed on the mobile terminal, and also decides the device to prepare the operation image 340. However, the present invention is not limited to this.

For example, the mobile terminal 50 may decide whether "individual display" or "composite display" is to be performed on the mobile terminal 50, whereas the MFP 10 may decide the device to prepare the operation image 340. More specifically, referring to the flowchart of FIG. 20, steps S15 to S17 (see FIG. 12) may be executed instead of steps S35 to S39, and referring to the flowchart including step S71 and others of FIG. 21, steps S54 to S56 (see FIG. 13) may be performed instead of steps S73 to S76.

Alternatively, the MFP 10 may decide whether "individual display" or "composite display" is to be performed on the mobile terminal 50, whereas the mobile terminal 50 may decide the device to prepare the operation image 340. More specifically, referring to the flowchart including step S13 and others of FIG. 12, steps S35 to S39 (see FIG. 20) may be executed instead of steps S15 to S17, and referring to the flowchart of FIG. 13, steps S73 to S76 (see FIG. 21) may be performed instead of steps S54 to S56.

In addition, in the third embodiment, the MFP 10 receives the result of the decision by the mobile terminal 50 (step S33), and then transmits the information on the two operation images 320 and 340 (steps S35 to S39). However, the present invention is not limited to this. For example, the MFP 10 may transmit the information on the two operation images 320 and 340 prior to the decision process (step S71) by the mobile terminal 50. The information on the two operation images 320 and 340 may include the image data of the operation image 320 and the image data of the operation image 340, or may include the image data of the operation image 320 and the information for generation of the operation image 340.

4. Others

The embodiments of the present invention have been described so far. However, the present invention is not limited to the contents described above.

For example, in the second embodiment and others, the operation image 340*a* is generated by the mobile terminal 50. However, the present invention is not limited to this. The operation image 340*a* may be generated by the MFP 10, not by the mobile terminal 50. More specifically, at steps S16 (see FIG. 12) and S37 (see FIG. 20), the operation image 340*a* may be generated by the MFP 10 according to the same method as step S55 or the like.

In the foregoing embodiments, the operation images 320*a* and 340*a* are exemplified as two different operation images 320 and 340. Specifically, the image 320*a* (see FIG. 5) corresponding to the operation image 220*a* (see FIG. 4) displayed on the operation unit 6 (specifically, the touch panel 25) of the MFP 10 is exemplified as first image. In addition, the image 340*a* (see FIGS. 5 and 6) including the plurality of hardware key images 310 (341 to 350) corresponding to the plurality of hardware keys 210 (see FIG. 4) provided on the operation unit 6 of the MFP 10 is exemplified as second image. Further, the image 360*a* is exemplified as composite image 360 of the two images.

Figure 25:
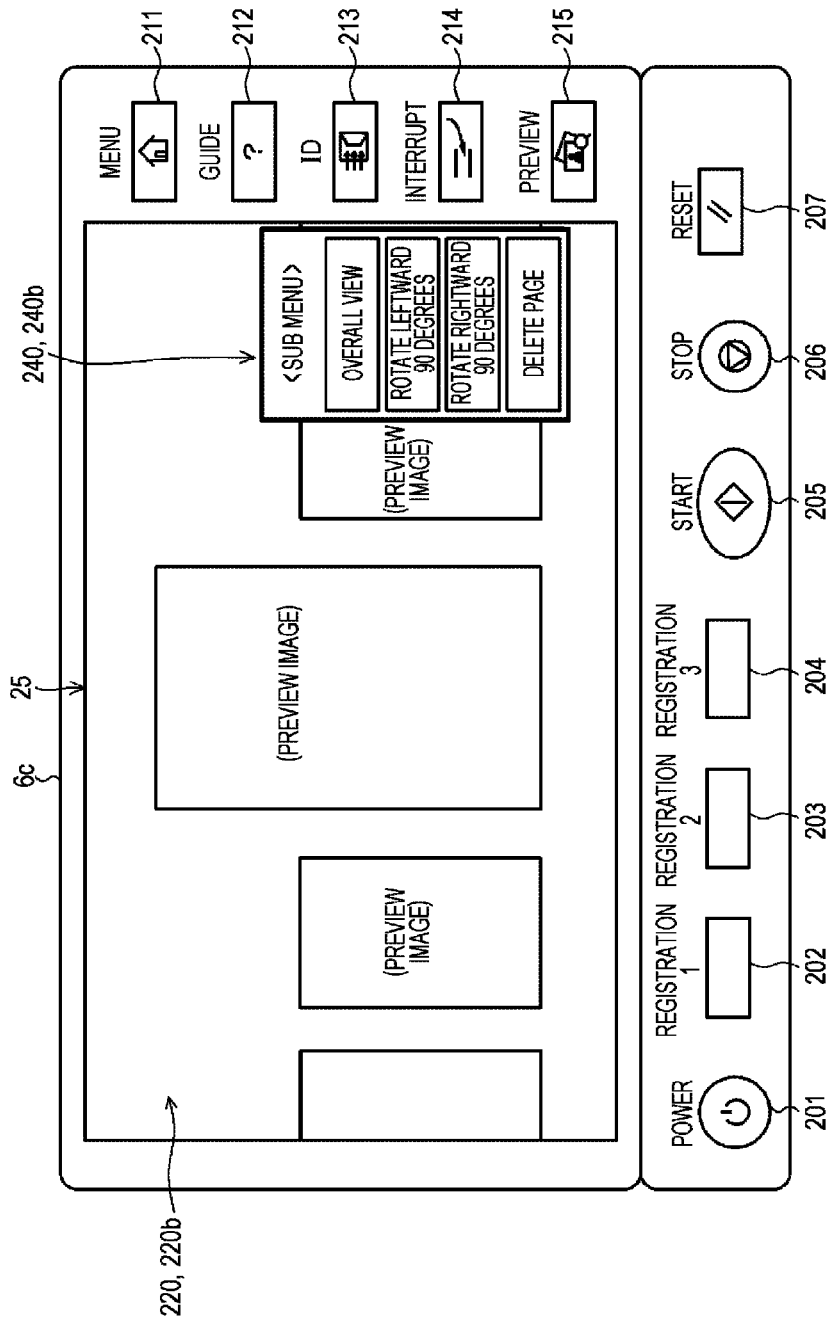
FIG. 25 is a diagram illustrating a display screen of an image forming apparatus according to a modification example.
Figure 27:
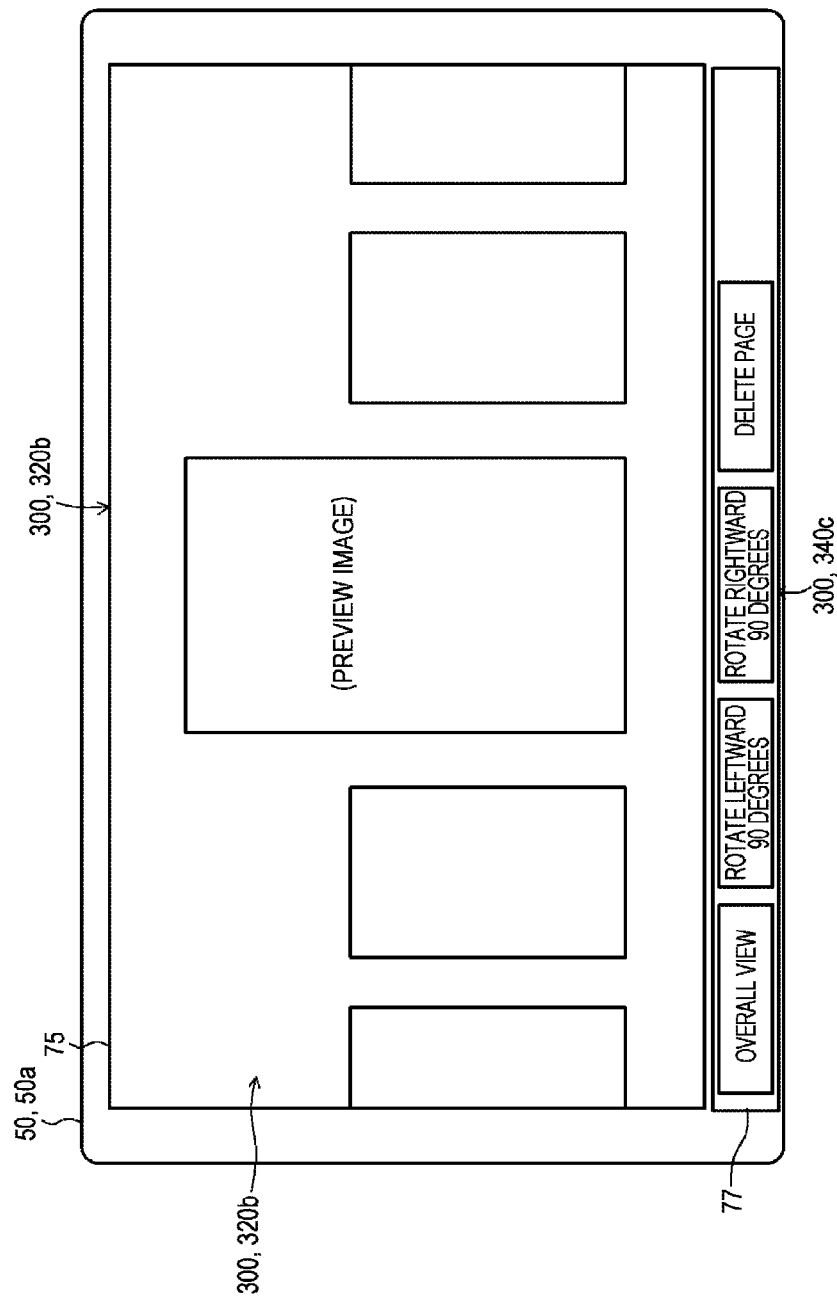
FIG. 27 is a diagram illustrating individual display of two operation images on two display units of the mobile terminal.

However, the present invention is not limited to this. The two different operation images 320 and 340 may be operation images 320*b* and 340*c* as illustrated in FIG. 27 or the like. The operation image 320*b* is a preview image corresponding to (and identical to) a preview display screen 220*b* (see FIG. 25) displayed on the operation unit 6 (the touch panel 25) of the MFP 10 (at the time of a scanning process). The operation image 340*c* is an image related to a pop-up screen 240*b* (see FIG. 25) superimposed on the preview display screen 220*b* on the operation unit 6 (the touch panel 25) of the MFP 10. The operation image 340*c* has the same item elements as the item elements on the pop-up screen 240*b* (see FIG. 25). The operation image 340*c* can be used to make selections as if making selections on the pop-up screen 240*b*.

When a plurality of images including the operation images 320*b* and 340*c* is specified as operation images and the number of the display units of the mobile terminal 50 is two or more, the operation image 320*b* may be displayed on the touch panel 75 and the operation image 340*c* may be displayed on the touch panel 77 (see FIG. 27).

Figure 26:
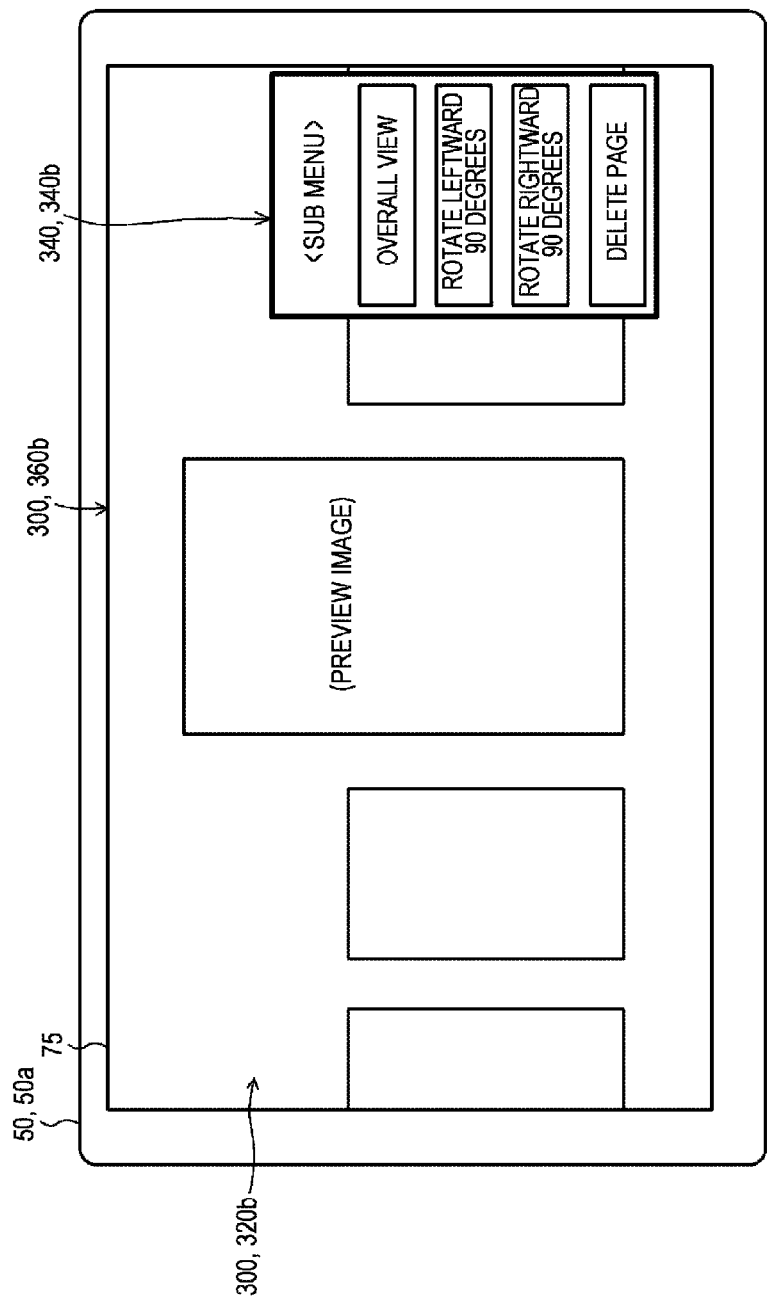
FIG. 26 is a diagram illustrating display of a composite image on a single display unit of the mobile terminal.

When a plurality of images including the operation images 320*b* and 340*c* is specified as operation images and the number of the display unit of the mobile terminal 50 is one, a composite image 360*b* of the operation image 320*b* and the operation image 340*c* may be displayed on the touch panel 75 (see FIG. 26). The composite image 360*b* is an image (composite image) formed by compositing the operation image 320*b* and the operation image 340*b* corresponding to the operation image 340*c*. The operation image 340*b* has the same item elements as the item elements included in the operation image 340*c* and has the same item elements as the item elements included in the pop-up screen 240*b* (see FIG. 25). The operation image 340*b* can be used to make selections as if making selections on the pop-up screen 240*b*.

When the operation images 320*b* and 340*c* are to be displayed as operation images on the mobile terminal 50, the same detailed operations as those in the first to fourth embodiments can be performed.

When the operation image 340*c* is to be used, the following preparation operation (generation operation) may be performed at steps S55 (see FIG. 13), S75 (see FIG. 21), and the like.

In the preparation operation, information for generation as described in FIG. 28 is used. The information for generation includes various kinds of information (item IDs, item names, positions (X, Y), sizes (W and H), and others) related to a plurality of item elements to be included in the operation image 340 (in this example, optional item elements in the pop-up screen).

Figure 29:
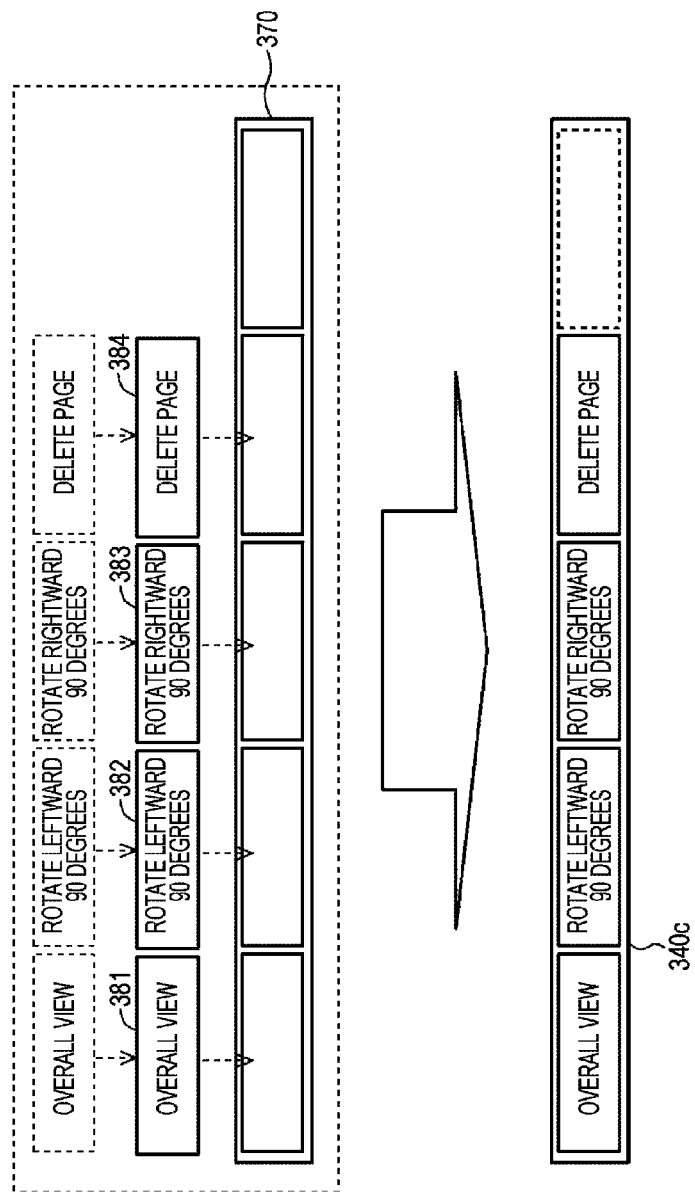
FIG. 29 is a conceptual diagram illustrating generation of the second image.

The mobile terminal 50 stores in advance in the storage unit 55 a model image (template image) 370 for a display image on the touch panel 77. In response to the request for preparation described above, the mobile terminal 50 extracts the element IDs from the information for generation included in the request for preparation, and generates component images for the items based on the item names corresponding to the item IDs. For example, the mobile terminal 50 generates an component image 381 (see FIG. 29) based on the item name "overall view" corresponding to the item ID "0001." Similarly, the mobile terminal 50 generates component images 382, 383, and others. The mobile terminal 50 then superimposes and arrange the component images on the template image 370 to generate the operation image 340*c* (see FIG. 29). More specifically, a plurality of spaces for arrangement of item elements is provided horizontally in the template image 370, and the mobile terminal 50 arranges the plurality of component images corresponding to the plurality of item elements (optional item elements) in the plurality of spaces for arrangement of item elements. Accordingly, the operation image 340*c* is generated with the plurality of component images (item elements) arranged in the horizontal direction. In this example, the operation image 340c having the plurality of component images is generated without the use of the position information (X, Y) or size information (W and H) included in the information for generation. However, the present invention is not limited to this. The operation image 340c may be generated with the use of the position information (X, Y) or size information (W and H).

The operation image 340c may be generated by the MFP 10 by the same method or the like at steps S16 (see FIG. 12) and S37 (see FIG. 20).

In addition, the foregoing idea may be applied when a plurality of images including the display image 320d displayed on the touch panel 25 and a warning image (warning screen) 340d superimposed on the display screen and displayed in a pop-up manner is specified as operation images. Shortly, the warning image 340d may be specified as operation image 340 (second image). In this case, as the warning image 340d, character strings indicating a warning message (warning character strings such as "The cover is open. Close the cover.") may be displayed in the horizontal direction.

Each of the operation images 320 and 340 may indicate certain information and accept operation inputs from the user or may indicate certain information but not accept the operation inputs. For example, the operation image 320b (see FIG. 27) may indicate the same contents as those on the preview display screen 220b for operations related to a preview image and may not accept operation inputs from the user. The warning image 340d may indicate a warning message but may not accept operation inputs from the user. These images may not be displayed on the touch panels 75 and 77 accepting operation inputs but may be displayed on a simple display unit merely displaying images but not accepting operation inputs. That is, the display units of the mobile terminal 50 may or may not accept operation inputs.

In the first embodiment and others, to the mobile terminal 50 the instruction for display indicating the decision on the display mode on the mobile terminal 50 at step S13. However, the present invention is not limited to this but the MFP 10 may transmit the instruction for display at another timing. For example, the MFP 10 may transmit to the mobile terminal 50 the decision together with the operation images 320 and 340 (or the request for preparation (the request for generation) of the operation image 340).

In the foregoing embodiments, the two images 320 and 340 are mainly specified as operation images at step S11. When a single image is specified as operation image at step S11, it is decided that the single image is to be displayed on one display unit (the touch panel 75 or the like) of the mobile terminal 50.

When three or more images are specified as operation images at step S11 and the number of the display units of the mobile terminal 50 is recognized as three or more, it may be decided that the display target images are to be displayed on the individual display units. For example, when the three images 320a, 340a, and 340d are specified as operation images, it may be decided that the three images 320a, 340a, and 340d are to be individually displayed on the three display units of the mobile terminal 50. In other words, it may be decided that the two images 320a and 340a are to be individually displayed on the two display units of the mobile terminal 50 and the other image 340d is to be displayed on the other display unit of the mobile terminal 50.

Alternatively, even when three or more images are specified as operation images at step S11 and the number of the display units of the mobile terminal 50 is recognized three or more, it may be decided that the display target images are to be displayed on only two display units (the first and second display units) without the use of the third display unit. For example, when the three images 320a, 340a, and 340d are specified as operation images, it may be decided that the two images 320a and 340a are to be individually displayed on the two display units of the mobile terminal 50 and the remaining warning image 340d is to be displayed on one of the two display units.

In the first embodiment and others, the MFP 10 acquires the information on the number of the display units of the mobile terminal 50 through communication. However, the present invention is not limited to this. For example, the MFP 10 may store in advance in the storage unit 5 the information on the number of the display units of the mobile terminal 50 so as to acquire the information on the number of the display units of the mobile terminal 50 by extracting the information from the storage unit 5.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus capable of being remotely operated by a mobile terminal, comprising:
    a processor that includes:
        a specification processing unit specifying an image to be displayed on the mobile terminal as an operation image for the image forming apparatus;
        an acquisition processing unit acquiring information on the number of displays of the mobile terminal; and
        a decision processing unit, when a plurality of images is specified as the operation images and the number of the displays of the mobile terminal is recognized as two or more, making a first decision that at least two of the plurality of images are to be displayed on at least two of the two or more displays of the mobile terminal, wherein the two or more displays are independent from each other and display different images; and
        a transmitter transmitting a display instruction based on the first decision to the mobile terminal, wherein the display instruction describes that a relatively large first image out of the at least two images is to be displayed on a relatively large first display out of the at least two displays, and that a relatively small second image out of the at least two images is to be displayed on a relatively small second display out of the at least two displays;
    wherein the processor further includes a determination processing unit determining whether the second image is to be prepared by the image forming apparatus or the mobile terminal based on the speed of network communication with the mobile terminal; and
    wherein the determination processing unit determines that the second image is to be prepared by the image forming apparatus when the network communication speed is higher than a predetermined level, and the determination processing unit determines that the second image is to be prepared by the mobile terminal when the network communication speed is lower than the predetermined level.

2. The image forming apparatus according to claim 1, wherein
    the first image corresponds to an operation screen displayed on the operation unit of the image forming apparatus, and the second image includes a plurality of hardware key images corresponding to a plurality of hardware keys provided in the operation unit of the image forming apparatus.

3. The image forming apparatus according to claim 2, wherein the second image is generated by arranging the plurality of hardware key images in a predetermined direction.

4. The image forming apparatus according to claim 1, wherein
the first image corresponds to a display screen displayed on the operation unit of the image forming apparatus, and
the second image relates to a pop-up screen superimposed and displayed on the display screen on the operation unit of the image forming apparatus.

5. The image forming apparatus according to claim 4, wherein the second image is generated by arranging a plurality of item elements included in the pop-up screen in a predetermined direction.

6. The image forming apparatus according to claim 1, wherein
when it is determined that the second image is to be prepared by the image forming apparatus, the transmitter transmits the at least two images prepared by the image forming apparatus to the mobile terminal, and
when it is determined that the second image is to be prepared by the mobile terminal, the transmitter transmits to the mobile terminal the first image and information for generation of the second image by the mobile terminal.

7. The image forming apparatus according to claim 1, wherein the transmitter transmits to the mobile terminal the first image out of the at least two images and information for generation of the second image out of the at least two images by the mobile terminal.

8. The image forming apparatus according to claim 1, wherein the transmitter transmits the at least two images prepared by the image forming apparatus to the mobile terminal.

9. The image forming apparatus according to claim 1, wherein
when a plurality of images including the at least two images is specified as the operation images and the number of the display of the mobile terminal is recognized as one, the decision processing unit makes a second decision that a composite image of the at least two images is to be displayed on the single display of the mobile terminal, and
the transmitter transmits a display instruction based on the second decision to the mobile terminal.

10. A non-transitory recording medium storing a computer readable program for causing a computer built in a mobile terminal capable of operating remotely an image forming apparatus to execute the steps of:
a) receiving a display instruction describing that at least two images are to be individually displayed as operation images for the image forming apparatus on at least two of a plurality of displays of the mobile terminal;
b) displaying the at least two images as operation images for the image forming apparatus individually on at least two out of the plurality of displays according to the display instruction, wherein the two or more displays are independent from each other and display different images;
c) determining whether one of the at least two images is to be prepared by the image forming apparatus or the mobile terminal based on the speed of network communication between the mobile terminal and the image forming apparatus; and
d) when it is determined that the one image is to be prepared by the mobile terminal, generating the one image.

11. The non-transitory recording medium storing a computer readable program according to claim 10, wherein
at the step c), it is determined that the one image is to be prepared by the image forming apparatus when the network communication speed is higher than a predetermined level, and it is determined that the one image is to be prepared by the mobile terminal when the network communication speed is lower than the predetermined level.

12. The non-transitory recording medium storing a computer readable program according to claim 10, wherein
the step d) includes:
d-1) when it is determined that the one image is to be prepared by the mobile terminal, transmitting a request for transmission of information for generation of the one image;
d-2) receiving the information for generation from the image forming apparatus; and
d-3) generating an image in which a plurality of item elements included in the information for generation is arranged in a predetermined direction as the one image.

13. An image forming system having an image forming apparatus and a mobile terminal capable of operating remotely the image forming apparatus, comprising:
an image forming apparatus including a processor, the processor including:
a specification processing unit specifying an image to be displayed as an operation image for the image forming apparatus on a mobile terminal; and
a decision processing unit, when a plurality of images is specified as the operation images and the number of the displays of mobile terminal is recognized as two or more, making a first decision that at least two of the plurality of images are to be displayed on at least two of the two or more displays of the mobile terminal, wherein the two or more displays are independent from each other and display different images; and
the mobile terminal including a processor, the processor including:
a display control processing unit displaying the at least two images on the at least two displays of the mobile terminal;
wherein the processor of the image forming apparatus further includes an acquisition processing unit acquiring information on the number of the displays of the mobile terminal;
the image forming apparatus further includes a transmitter transmitting to the mobile terminal a display instruction corresponding to the first decision made by the decision processing unit based on the number of the images specified by the specification processing unit and the number of the displays specified by the acquisition processing unit;
the mobile terminal has a receiver receiving the display instruction from the image forming apparatus, and
the mobile terminal displays by the display control processing unit the at least two images individually on the at least two displays based on the received display instruction.

14. The image forming system according to claim 13, wherein
 the image forming apparatus has a transmitter, when a plurality of operation images is specified by the specification processing unit, transmitting to the mobile terminal a notification that the number of display target images to be displayed as the operation images on the mobile terminal is plural, and
 the mobile terminal has a receiver receiving from the image forming apparatus the notification that the number of the display target images is plural, and
 the mobile terminal displays the plurality of images by the display control processing unit in response to the first decision made by the decision processing unit based on the notified number of the display target images and the number of the displays of the mobile terminal.

15. A non-transitory recording medium storing a computer readable program for causing a computer built in a mobile terminal capable of operating remotely an image forming apparatus to execute the steps of:
 a) receiving from the image forming apparatus a notification that the number of display target images to be displayed on the mobile terminal as operation images for the image forming apparatus is plural;
 b) when the notification that the number of the display target images is plural is received and the number of displays of the mobile terminal is two or more, making a first decision that at least two of the plurality of images are to be individually displayed on at least two of the two or more displays of the mobile terminal, wherein the two or more displays are independent from each other and display different images;
 c) displaying the plurality of images according to the first decision;
 d) determining whether one of the at least two images is to be prepared by the image forming apparatus or the mobile terminal based on the speed of network communication with the image forming apparatus; and
 e) when it is determined that the one image is to be prepared by the mobile terminal, generating the one image.

16. The non-transitory recording medium storing a computer readable program according to claim 15, wherein
 at the step d), it is determined that the one image is to be prepared by the image forming apparatus when the network communication speed is higher than a predetermined level, and it is determined that the one image is to be prepared by the mobile terminal when the network communication speed is lower than the predetermined level.

17. The non-transitory recording medium storing a computer readable program according to claim 15, wherein
 the step e) includes:
 e-1) when it is determined that the one image is to be prepared by the mobile terminal, transmitting to the image forming apparatus a request for transmission of information for generation of the one image;
 e-2) receiving the information for generation from the image forming apparatus; and
 e-3) generating an image in which a plurality of item elements included in the information for generation is arranged in a predetermined direction as the one image.

18. The non-transitory recording medium storing a computer readable program according to claim 17, wherein
 the other of the at least two images corresponds to a display screen displayed on the operation unit of the image forming apparatus,
 the one image relates to a pop-up screen superimposed and displayed on the display screen on the operation unit of the image forming apparatus, and
 at step e-3), an image in which component images related to a plurality of item elements related to the pop-up screen is arranged in the determined direction is generated as the one image.

19. The non-transitory recording medium storing a computer readable program according to claim 17, wherein
 the other of the at least two images corresponds to an operation screen displayed on the operation unit of the image forming apparatus,
 the one image includes a plurality of hardware key images corresponding to a plurality of hardware keys in the operation unit of the image forming apparatus, and
 at step e-3), an image in which the plurality of hardware key images is arranged in the determined direction is generated as the one image.

20. An image forming apparatus capable of being remotely operated by a mobile terminal, comprising:
 a processor that includes a specification processing unit specifying an image to be displayed on the mobile terminal as an operation image for the image forming apparatus; and
 a transmitter, when a plurality of images is specified as the operation images, transmitting to the mobile terminal a notification that the number of display target images to be displayed as the operation images on the mobile terminal is plural, so that the mobile terminal decides whether at least two of the operation images are to be individually displayed on at least two of the plurality of display of the mobile terminal, wherein the two or more displays are independent from each other and display different images;
 wherein the processor further includes a determination processing unit determining whether one of the at least two images is to be prepared by the image forming apparatus or the mobile terminal based on the speed of network communication with the mobile terminal;
 wherein the determination processing unit determines that the one image is to be prepared by the image forming apparatus when the network communication speed is higher than a predetermined level;
 wherein the determination processing unit determines that the one image is to be prepared by the mobile terminal when the network communication speed is lower than the predetermined level; and
 when it is determined that the one image is to be prepared by the image forming apparatus, the transmitter transmits the one image prepared by the image forming apparatus to the mobile terminal, and
 when it is determined that the one image is to be prepared by the mobile terminal, the transmitter transmits to the mobile terminal information for generation of the one image by the mobile terminal and the other of the at least two images.

* * * * *